US012684006B2

(12) United States Patent
Shelef et al.

(10) Patent No.: US 12,684,006 B2
(45) Date of Patent: Jul. 14, 2026

(54) SECURE SECRETS CORRELATION

(71) Applicant: Oasis Security Ltd., Tel Aviv (IL)

(72) Inventors: Barak Shelef, Tel Aviv (IL); Amit Zimerman, Tel Aviv (IL)

(73) Assignee: Oasis Security Ltd., Tel Aviv (IL)

( * ) Notice: Subject to any disclaimer, the term of this patent is extended or adjusted under 35 U.S.C. 154(b) by 189 days.

(21) Appl. No.: 18/788,459

(22) Filed: Jul. 30, 2024

(65) Prior Publication Data

US 2026/0039679 A1 Feb. 5, 2026

(51) Int. Cl.
 H04L 9/40 (2022.01)
 H04L 9/32 (2006.01)

(52) U.S. Cl.
 CPC ........ H04L 63/1433 (2013.01); H04L 9/3213 (2013.01); H04L 9/3297 (2013.01)

(58) Field of Classification Search
 CPC ... H04L 9/3247; H04L 9/0643; H04L 9/3236; H04L 9/0861; H04L 9/0894; H04L 63/083; H04L 9/3226; H04W 12/041; H04W 12/069; H04W 12/06; H04W 12/068; H04W 12/0471; H04W 12/0433; G06F 21/64; G06F 21/6245; G06F 21/602; G06F 21/606; G06F 21/445
 See application file for complete search history.

(56) References Cited

U.S. PATENT DOCUMENTS

| | | | |
|---|---|---|---|
| 8,533,803 B2 | 9/2013 | Cha et al. | |
| 8,904,181 B1 | 12/2014 | Felsher et al. | |
| 9,165,153 B2 | 10/2015 | Fielder | |
| 9,621,523 B2 | 4/2017 | Rothstein et al. | |
| 9,698,985 B2 | 7/2017 | McCusker et al. | |
| 9,942,034 B2 | 4/2018 | Le Saint et al. | |
| 10,516,533 B2 | 12/2019 | Mannan et al. | |
| 10,880,089 B2 | 12/2020 | Brown et al. | |
| 11,165,581 B2 | 11/2021 | Hunt | |
| 11,652,627 B2 | 5/2023 | Wentz | |
| 2012/0201381 A1 | 8/2012 | Miller et al. | |
| 2016/0241389 A1 | 8/2016 | Le Saint et al. | |
| 2017/0195346 A1* | 7/2017 | Be'ery ................... | H04L 63/10 |
| 2018/0270251 A1* | 9/2018 | Roth ....................... | G06F 21/71 |
| 2019/0207966 A1* | 7/2019 | Vashisht ............... | G06F 21/564 |
| 2019/0268315 A1 | 8/2019 | Miller et al. | |
| 2023/0019729 A1 | 1/2023 | Karp et al. | |
| 2023/0063214 A1 | 3/2023 | Tischler et al. | |
| 2023/0173395 A1 | 6/2023 | Cella et al. | |
| 2024/0062200 A1 | 2/2024 | Wright et al. | |
| 2024/0204991 A1 | 6/2024 | Patel et al. | |

* cited by examiner

*Primary Examiner* — Wasika Nipa
*Assistant Examiner* — Edgar W Xie
(74) *Attorney, Agent, or Firm* — M&B IP Analysts, LLC

(57) ABSTRACT

A system and method for secure secrets management. A method includes creating an inventory of a plurality of non-secret identifiers used by entities acting with respect to a computing environment; correlating between secrets of a plurality of secrets and non-secret identifiers of the plurality of non-secret identifiers based on data indicating use of the plurality of secrets and the plurality of non-secret identifiers with respect to the computing environment; detecting a secrets-based vulnerability with respect to at least one first secret of the plurality of secrets based on the correlation between the secrets of the plurality of secrets and the non-secret identifiers of the plurality of non-secret identifiers; and performing a remediation action to secure the at least one first secret based on the detected secrets-based vulnerability.

17 Claims, 15 Drawing Sheets

SECURE SECRETS CORRELATION

TECHNICAL FIELD

The present disclosure relates generally to secrets management, and more specifically to correlating secrets with identities in order to secure computing environments.

BACKGROUND

Secrets are commonly used for authentication. As a result, malicious actors often seek to compromise secrets in order to conduct cyber-attacks. Techniques for securing secrets or otherwise securing computing environments which use secrets for authentication are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for secure secrets management. The method comprises: creating an inventory of a plurality of non-secret identifiers used by entities acting with respect to a computing environment; correlating between secrets of a plurality of secrets and non-secret identifiers of the plurality of non-secret identifiers based on data indicating use of the plurality of secrets and the plurality of non-secret identifiers with respect to the computing environment; detecting a secrets-based vulnerability with respect to at least one first secret of the plurality of secrets based on the correlation between the secrets of the plurality of secrets and the non-secret identifiers of the plurality of non-secret identifiers; and performing a remediation action to secure the at least one first secret based on the detected secrets-based vulnerability.

Certain embodiments disclosed herein also include a non-transitory computer readable medium having stored thereon causing a processing circuitry to execute a process, the process comprising: creating an inventory of a plurality of non-secret identifiers used by entities acting with respect to a computing environment; correlating between secrets of a plurality of secrets and non-secret identifiers of the plurality of non-secret identifiers based on data indicating use of the plurality of secrets and the plurality of non-secret identifiers with respect to the computing environment; detecting a secrets-based vulnerability with respect to at least one first secret of the plurality of secrets based on the correlation between the secrets of the plurality of secrets and the non-secret identifiers of the plurality of non-secret identifiers; and performing a remediation action to secure the at least one first secret based on the detected secrets-based vulnerability.

Certain embodiments disclosed herein also include a system for secure secrets management. The system comprises: a processing circuitry; and a memory, the memory containing instructions that, when executed by the processing circuitry, configure the system to: create an inventory of a plurality of non-secret identifiers used by entities acting with respect to a computing environment; correlate between secrets of a plurality of secrets and non-secret identifiers of the plurality of non-secret identifiers based on data indicating use of the plurality of secrets and the plurality of non-secret identifiers with respect to the computing environment; detect a secrets-based vulnerability with respect to at least one first secret of the plurality of secrets based on the correlation between the secrets of the plurality of secrets and the non-secret identifiers of the plurality of non-secret identifiers; and perform a remediation action to secure the at least one first secret based on the detected secrets-based vulnerability.

Certain embodiments disclosed herein include the method, non-transitory computer readable medium, or system noted above, further including or being configured to perform the following step or steps: correlating network identifying information between vault audit log data and platform audit log data based on a plurality of timestamps of the vault audit log data and the platform audit log data, wherein the vault audit log data indicates network identifying information for a plurality of entities which accessed secrets among the plurality of secrets within a vault, wherein the platform audit log data indicates a plurality of identities used for authentication, wherein the secrets and the non-secret identifiers are correlated based on the correlated network identifying information.

Certain embodiments disclosed herein include the method, non-transitory computer readable medium, or system noted above, further including or being configured to perform the following step or steps: correlating object names of a plurality of objects accessed by a plurality of entities within the computing environment; and mapping between entities of the plurality of entities within the computing environment based on the correlated object names, wherein the secrets and the non-secret identifiers are correlated based further on the mapping between the entities of the plurality of entities within the computing environment.

Certain embodiments disclosed herein include the method, non-transitory computer readable medium, or system noted above, wherein the plurality of non-secret identifiers is a first plurality of non-secret identifiers, further including or being configured to perform the following step or steps: transmitting the first plurality of non-secret identifiers to an agent deployed with respect to the computing environment, wherein the agent is configured to compare between the first plurality of non-secret identifiers and a second plurality of non-secret identifiers corresponding to respective secrets of the plurality of secrets in order to determine comparison results; and receiving the comparison results from the agent, wherein the secrets of the plurality of secrets and the non-secret identifiers of the first plurality of non-secret identifiers are correlated based on the comparison results.

Certain embodiments disclosed herein include the method, non-transitory computer readable medium, or system noted above, further including or being configured to perform the following step or steps: deploying the agent with respect to the computing environment, wherein the agent is configured to index the plurality of secrets into the plurality of secret indices.

Certain embodiments disclosed herein include the method, non-transitory computer readable medium, or system noted above, wherein each secret index of the plurality of secret indices includes at least one hash.

Certain embodiments disclosed herein include the method, non-transitory computer readable medium, or system noted above, wherein the at least one hash of each secret index includes at least one first hash and at least one second hash, wherein each first hash of each secret index corresponds to a secret among the plurality of secrets, wherein each second hash of each secret index corresponds to a non-secret identifier among the plurality of non-secret identifiers.

Certain embodiments disclosed herein include the method, non-transitory computer readable medium, or system noted above, wherein the plurality of non-secret identifiers is a first plurality of non-secret identifiers, further including or being configured to perform the following step or steps: receiving a plurality of secret indices from an agent deployed with respect to the computing environment wherein the plurality of secret indices is created based on the plurality of secrets; tokenizing the plurality of non-secret identifiers into a plurality of tokens; hashing the plurality of tokens in order to generate a plurality of hashes; comparing between the plurality of hashes and the plurality of secret indices in order to determine comparison results, wherein the secrets of the plurality of secrets and the non-secret identifiers of the plurality of non-secret identifiers are correlated based on the comparison results.

Certain embodiments disclosed herein include the method, non-transitory computer readable medium, or system noted above, wherein the remediation action includes changing deployment of the at least one first secret.

Certain embodiments disclosed herein include the method, non-transitory computer readable medium, or system noted above, wherein the remediation action includes modifying a policy used to control access to each of the at least one first secret.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include techniques for secure secrets management. The disclosed embodiments provide various architectures, software, processes, and the like, which may be utilized to improve security in computing environments utilizing secrets. Various disclosed embodiments provide techniques for correlating secrets with non-secret identifiers of entities which use the secrets. These correlations may be used for purposes such as, but not limited to, determining which secrets belong to which entities, detecting unauthorized use or storage of secrets, and the like. As a result, the disclosed embodiments can be leveraged to improve security of computing environments in which secrets are used. Moreover, the disclosed embodiments enable defining and accurately enforcing policies granularly with respect to secrets usage by specific identities.

In this regard, it has been identified that, unless documented through configuration management, correlations between secrets stored in secrets vaults and the identifiers or other use cases that those secrets serve are inaccessible to entities acting for an organization. This challenge is further compounded by the high number of identity data providers and vaults which might be used interchangeably. As a result, accurately verifying whether secrets are stored securely and being used in permissible ways can be very difficult, and enforcing policies that rely on such verification may not be possible in at least some circumstances.

The disclosed embodiments provide techniques which aid in discovering, inventorying, and otherwise providing visibility into secrets storage and usage which allow for effective policy enforcement for secrets usage-based policies. In particular, various disclosed embodiments utilize correlations between non-secret identifiers (NS-IDs) and secrets in order to identify storage or usage of secrets based on storage or usage of their correlated NS-IDs. Various disclosed embodiments further provide other techniques for contextualizing secrets data which may aid in accurately identifying storage and usage of secrets such as, but not limited to, contextualization based on consumer usage and based on object naming.

Figure 1:
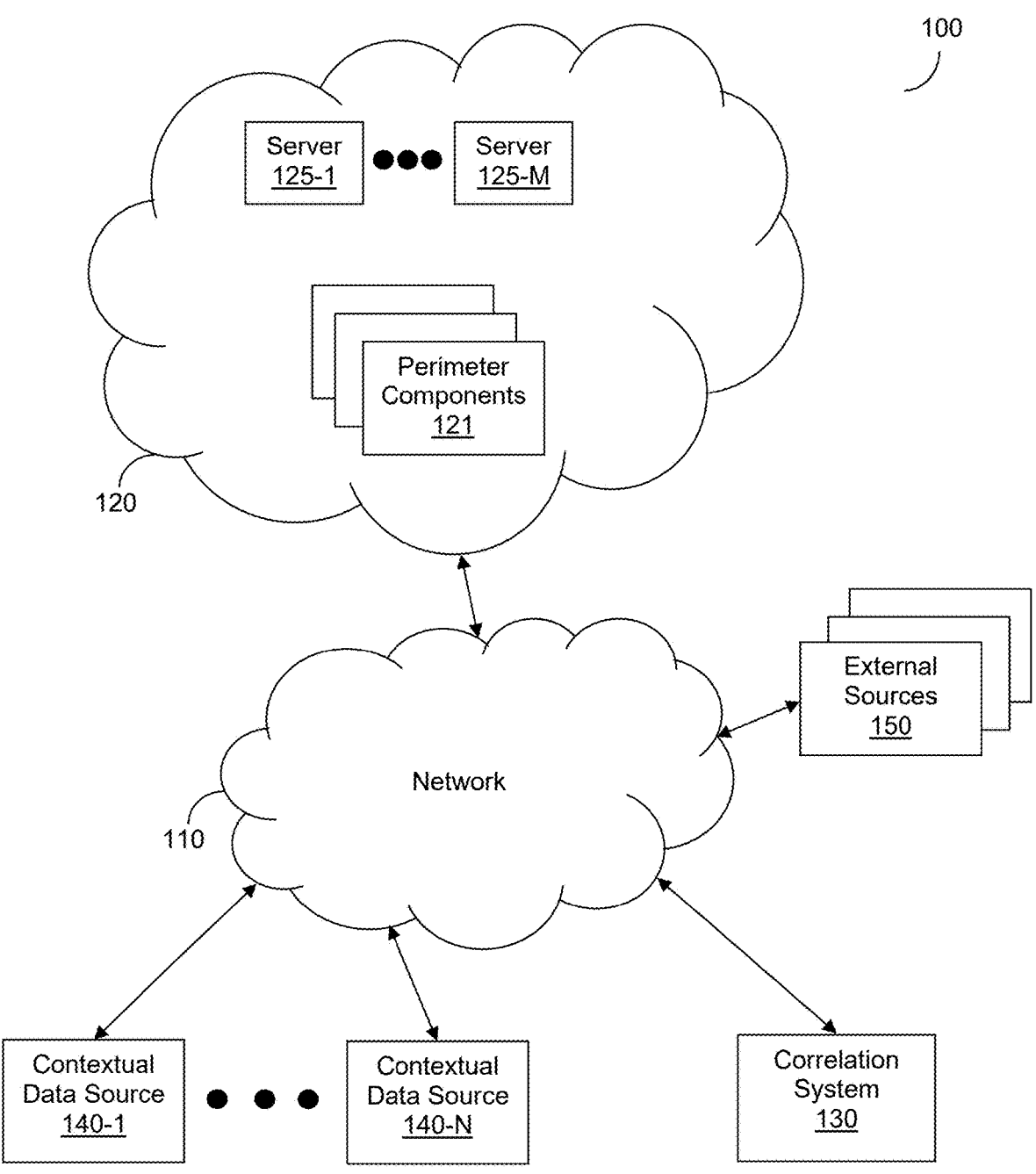
FIG. 1 is a network diagram utilized to describe various disclosed embodiments.

FIG. 1 shows an example network diagram 100 utilized to describe the various disclosed embodiments. In the example network diagram 100, computing environment 120, a correlation system 130, contextual data sources 140-1 through 140-N (where N is an integer having a value greater than or equal to 1, hereinafter referred to individually as a contextual data source 140 or collectively as contextual data sources 140), and one or more external sources 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 is a computing environment in which secrets are to be utilized, stored, both, and the like. Accordingly, in accordance with various disclosed embodiments, the computing environment 120 may be secured by managing secrets as discussed herein and, in particular, correlating secrets with identifiers of entities operating within or with the computing environment 120.

The computing environment may include, but is not limited to, one or more perimeter components 121 and one or more servers 125-1 through 125-M (where M is an integer having a value equal to or greater than 1). The perimeter components 121 may be or may include computing components, which may be logical or physical components. These computing components acting as the perimeter components 121 may be utilized to coordinate and communicate with the correlation system 130 in order to realize various disclosed embodiments. In some embodiments, at least a portion of the disclosed processes may be performed by one or more of the perimeter components 121. In particular, in at least some embodiments, at least zero-knowledge secrets indexing may be performed via a correlation agent among the perimeter components 121. Non-limiting example perimeter components which are discussed further with respect to FIGS. 2-5 include a vault, a platform, a fetcher, a correlation agent, combinations thereof, and the like.

The servers 125 may be utilized to host computing components which use, store, or otherwise interact with secrets. Accordingly, the disclosed embodiments may be utilized to manage secrets access by the servers 125. To this end, the disclosed embodiments may include correlating identities of computing components realized via the servers 125 with secrets used by those computing components in order to manage use of secrets by those computing components to protect the computing environment 120 against secrets misuse.

The correlation system 130 is configured to perform at least some of the disclosed embodiments in order to manage secrets to be utilized or stored within the computing environment 120. To this end, the correlation system 130 may include or communicate with logical components (not depicted in FIG. 1) such as, but not limited to, an extract-transform-load (ETL) pipeline, a database including a set of consumers, a mapping service, an inventory of secrets, a correlation database, an inventory of non-secret identifiers (NS-IDs), a database including hashes, combinations thereof, and the like. Non-limiting example configurations of logical components which may be utilized by the correlation system 130 to support various disclosed embodiments are described further below with respect to FIGS. 2-5.

The correlation system 130 is therefore configured to correlate secrets with other data such as NS-IDs as described herein in order to enable enforcing policies related to secrets stored and usage by entities using NS-IDs. In some embodiments, the correlation system 130 is configured to used zero-knowledge secret indices created based on hashes of tokenized secrets in order to identify storage and usage of the secrets without storing the secrets in the correlation system 130.

In some implementations, the correlation system 130 may be configured to access data to be used for contextually enriching identities, for example from the contextual data sources 140. To this end, the correlation system 130 is configured to connect to integrations (not depicted in FIG. 1), where each integration incorporates functions of one or more respective services (also not depicted in FIG. 1) through which data stored in the contextual data sources 140 is accessible. The correlation system 130 may be configured to utilize such data in order to enrich identity data, thereby providing additional context to the identifiers represented by the identity data. Such enriched identity data may be utilized to more accurately represent different entities (e.g., entities among computing components realized via the servers 125) in order to further improve the disclosed embodiments, for example, by more uniquely identifying components and correlating the more unique identifiers of those components to secrets, thereby improving secrets management in accordance with various disclosed embodiments.

The external sources 150 may be or may include, but are not limited to, Internet domain information or other network identifying information data sources such as, but not limited to, a domain name system (DNS), an Internet registry (e.g., Whois), and the like. Data in the external sources 150 may be utilized to add context to secrets usage as described herein in order to further improve secrets correlation.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
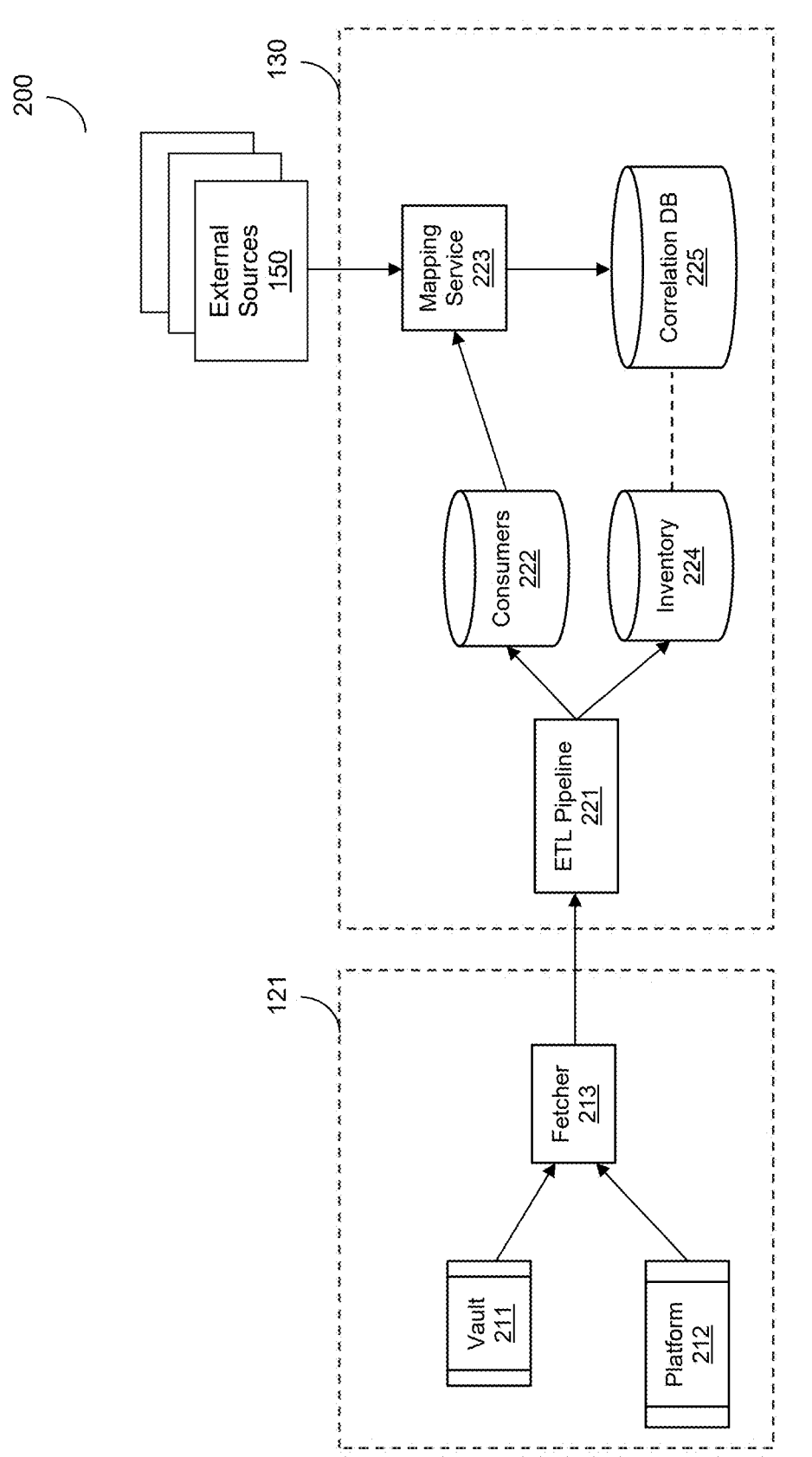
FIG. 2 is a data flow diagram utilized to illustrate consumer usage correlation.

FIG. 2 is a data flow diagram 200 utilized to illustrate consumer usage correlation. As depicted in FIG. 2, a correlation system 130 communicates with a set of perimeter components 121 and with one or more external sources 150 in order to correlate consumer usage of secrets with identities which used the secrets. More specifically, the perimeter components 121 depicted in FIG. 2 include a vault 211, a platform 212, and a fetcher 213. The correlation system 130 depicted in FIG. 2 has logical components including an extract-transform-load (ETL) pipeline 221, a consumers database 222, a mapping service 223, a secrets inventory 224, and a correlation database (DB) 225.

On the perimeter side, the fetcher 213 obtains audit logs from each of the vault 211 and the platform 212. More specifically the audit logs may include, but are not limited to, secret access logs from the vault 211, identity authentication logs from the platform 212, resource access logs from the platform 212, and the like. The fetcher 213 transmits the audit logs to the correlation system 130.

Consumers may be identified within the audit logs via processing by the correlation system 130. More specifically, the audit logs provided by the fetcher 213 are loaded into the consumers database 222 and the inventory 224 via the ETL pipeline 221. The mapping service 223 is configured to correlate consumers represented in the consumers database 222 (e.g., via a set of consumer identifiers or other sets of consumer-identifying data for different consumers of secrets) with data from the external sources 150. More specifically, the data from the external sources which may be correlated to the consumers may include, but is not limited to, Internet domain information or other network identifying information (e.g., domain name system [DNS] data, Internet registration data, etc.), Internet Protocol (IP) lease data, both, and the like. The consumers may be correlated to external source data using time regression. The results of correlating between the consumers and the external source data may be stored in the correlation database 225 and used to map and score relationships between and among consumers, stored secrets, identities, and resources.

Figure 3:
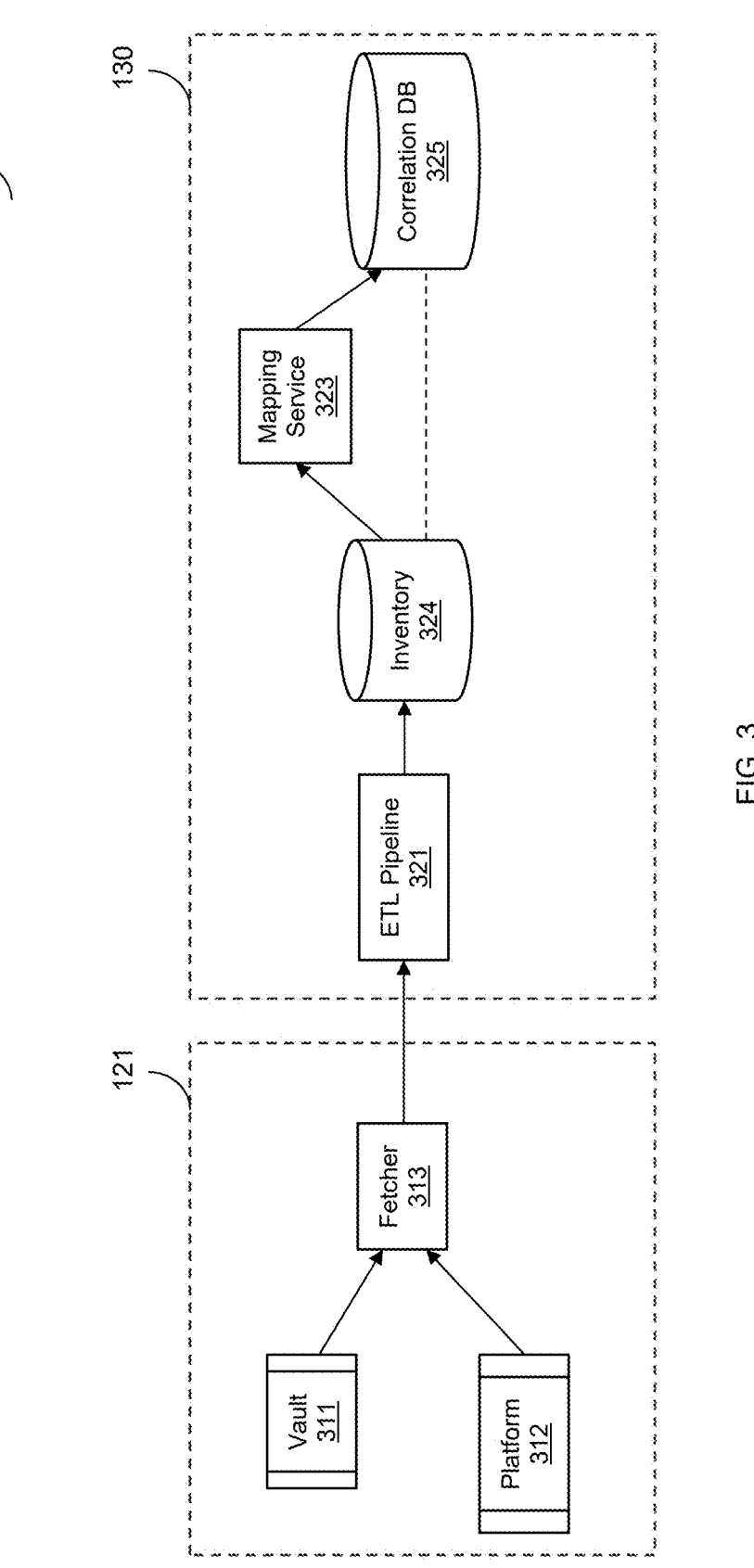
FIG. 3 is a data flow diagram utilized to illustrate object naming correlation.

FIG. 3 is a data flow diagram 300 utilized to illustrate object naming correlation. As depicted in FIG. 3, a correlation system 130 communicates with a set of perimeter components 121 in order to correlate secrets with names of objects accessed or otherwise interacted with using those secrets. More specifically, the perimeter components 121 depicted in FIG. 3 include a vault 311, a platform 312, and a fetcher 313. The correlation system 130 depicted in FIG. 3 has logical components including an extract-transform-load (ETL) pipeline 321, a mapping service 323, a secrets inventory 324, and a correlation database (DB) 325.

On the perimeter side, the fetcher 313 obtains inventory metadata from each of the vault 311 and the platform 312. More specifically, the inventory metadata indicates objects along with their respective names and references from data sources such as vaults (and the secrets stored therein), data indicating identities and the secrets used by those identities, resources which utilize those objects, and the like. One or more identity policies are processed in order to link resources to identities.

Object names as identified in data associated with vaults, secrets stored in vaults, identities, secrets used by identities, resources, and the like, may be correlated to each other via processing by the correlation system 130. More specifically, the inventory metadata provided by the fetcher 313 are loaded into the inventory 324 via the ETL pipeline 321. The mapping service 323 is configured to correlate object names loaded in the inventory 324 to each other. To this end, the mapping service 323 may be configured to match object names using a string similarity metric (e.g., by matching different names which have a string similarity metric above a predetermined threshold). The correlations between object names as identified in data associated with vaults, secrets stored in vaults, identities, secrets used by identities, resources, and the like are stored in the correlations database 325. The relationships between vaults, stored secrets, identities, and resources may be mapped and scored based on the matching of object names between respective sets of data (e.g., the sets of data which include object names and data related to vaults, secrets stored in vaults, identities, secrets used by identities, resources, etc.).

Figure 4:
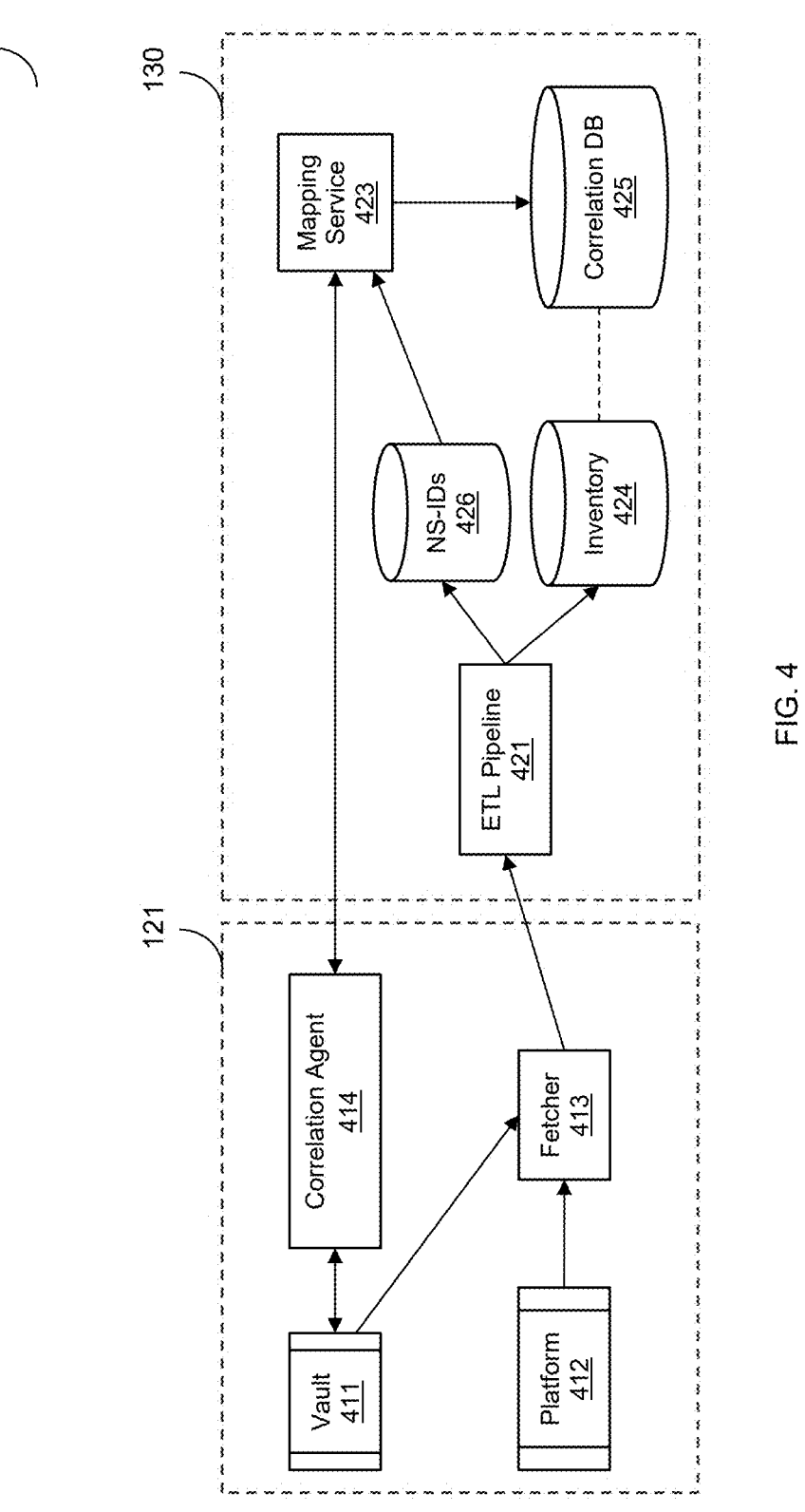
FIG. 4 is a data flow diagram utilized to illustrate non-secret identifier correlation.

FIG. 4 is a data flow diagram 400 utilized to illustrate non-secret identifier (NS-ID) correlation. FIG. 4 illustrates an example implementation in which a correlation agent 414 is configured to provide certain secret-related information such as non-secret identifiers to a correlation system 130 in a direct access manner. In such an implementation, the correlation system 130 may compare identifiers such as non-secret identifiers indicated in data received from the correlation agent 414 to identifiers indicated in data provided by the fetcher 413 directly (i.e., comparing the identifiers themselves rather than hashes or other representations of the identifiers).

As depicted in FIG. 4, the correlation system 130 communicates with a set of perimeter components 121 in order to correlate secrets with non-secret identifiers. More specifically, the perimeter components 121 depicted in FIG. 4 include a vault 411, a platform 412, a fetcher 413, and a correlation agent 414. The correlation system 130 depicted in FIG. 4 has logical components including an extract-transform-load (ETL) pipeline 421, a mapping service 423, a secrets inventory 424, a correlation database (DB) 425, and a non-secret identifiers (NS-IDs) database 426.

On the perimeter side, the fetcher 413 obtains inventory metadata from the platform 412. More specifically, the inventory metadata may include data related to identities and secrets used by identities, resources, and the like. Moreover, such metadata includes NS-IDs. The inventory metadata is transmitted from the fetcher 413 to the ETL pipeline 421. The vault 411 provides audit logs related to secrets stored in the vault to the fetcher 413. Such audit logs may indicate NS-IDs used by identities and resources with respect to secrets stored in the vault 411 (e.g., NS-IDs of entities which used or otherwise accessed secrets stored in the vault 411).

The NS-IDs are inventoried by the correlation system 130. To this end, the data from the platform 412 transmitted by the fetcher 413 is loaded, via the ETL pipeline 421, into the inventory 424 and the NS-IDs database 426. More specifically, the inventory 424 may store the identities and secrets used by those identities, identifiers of the resources, or both, which are stored alongside respective NS-IDs which are stored in the NS-IDs database 426.

The mapping service 423 is configured to communicate the NS-IDs among the NS-IDs database 426 to the correlation agent 414. The correlation agent 414, in turn, is configured to search through the vault 411 for secrets, and to correlate the NS-IDs communicated by the mapping service 423 to the secrets stored in the vault 411. The correlation agent 414 is configured to transmit the results of the search back to the correlation system 130, for example, by providing those results to the mapping service 423. The mapping service 423 is configured to map and score relationships between the secrets stored in the vault 411 and the NS-IDs based on the results of the search.

The ETL pipeline 421 loads NS-IDs among the inventory metadata into the NS-IDs database 426 and the data related to identities and resources into the inventory 424. The mapping service 523 is configured to correlate NS-IDs among the NS-IDs database 426 with secrets stored in the vault 411. The correlations are stored in the correlation database 425 and used to map and score relationships between NS-IDs and secrets stored in the vault 411.

Figure 5:
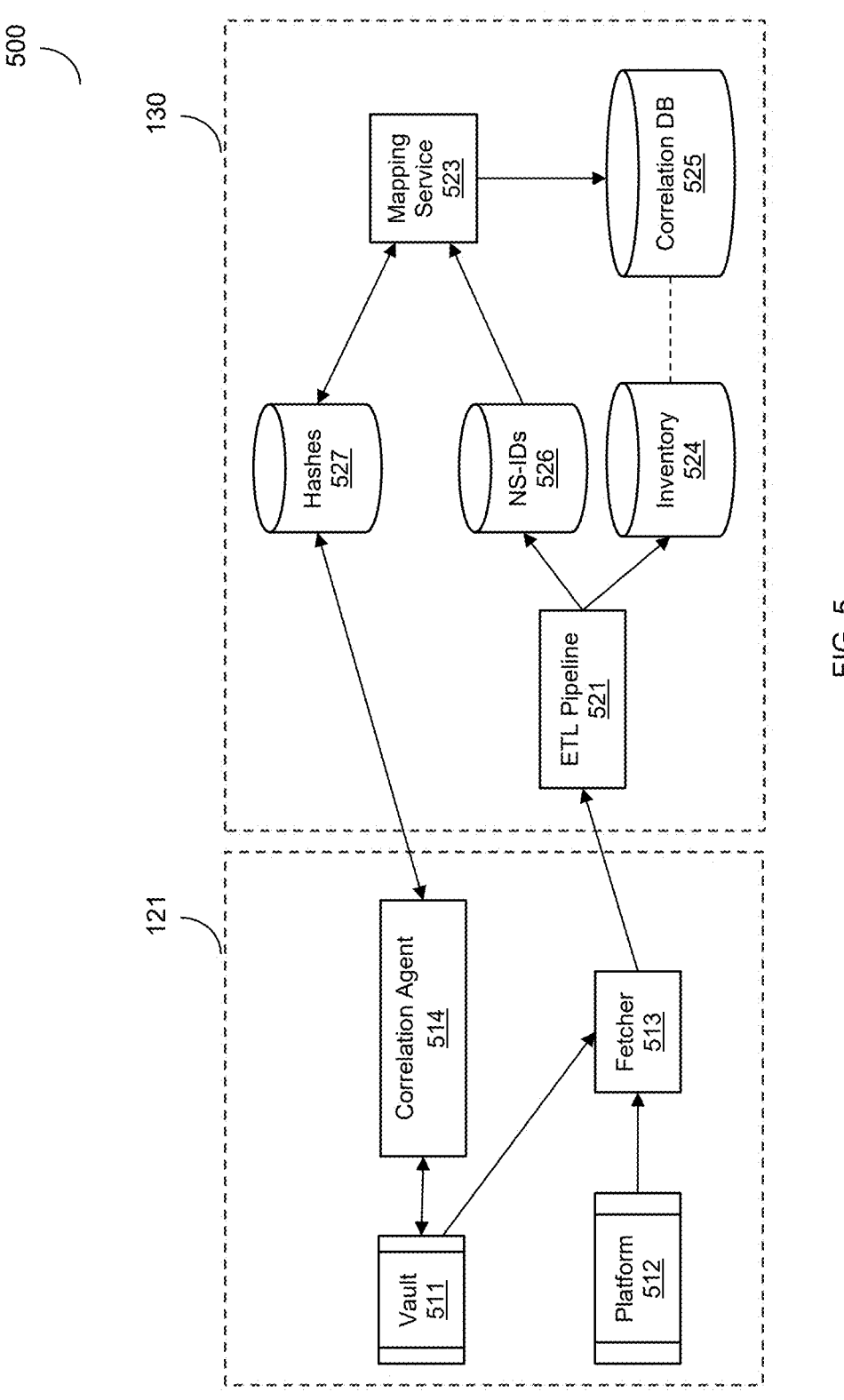
FIG. 5 is a data flow diagram utilized to illustrate zero-knowledge non-secret identifier correlation.

FIG. 5 is a data flow diagram 500 utilized to illustrate zero-knowledge non-secret identifier correlation. FIG. 5 illustrates an example implementation in which a correlation agent 514 is configured to provide access to secret-related information such as non-secret identifiers to a correlation system 130 in a zero-knowledge manner (i.e., without revealing the identifiers themselves to the correlation system 130). In such an implementation, the correlation system 130 may compare identifiers such as non-secret identifiers indicated in data received from the correlation agent 514 to identifiers indicated in data provided by the fetcher 413 indirectly (e.g., comparing hashes of the identifiers rather than comparing the identifiers themselves), which enables performing such a comparison in a zero-knowledge manner in which the correlation system 130 does not ever have access to the underlying identifiers. In accordance with various disclosed embodiments utilizing such an implementation, identifiers among data to be communicated to the correlation system 130 (e.g., data sent by the correlation agent 514 and the fetcher 513) may be hashed, and the hashes of the identifiers are sent among such data rather than the identifiers themselves.

As depicted in FIG. 5, the correlation system 130 communicates with a set of perimeter components 121 in order to correlate secrets with non-secret identifiers using a zero-knowledge indexing process. As discussed herein, the zero-knowledge indexing process allows for providing the secrets to the correlation system 130 in a secure manner, i.e., such that leakage or other improper access to the indices held by the correlation system will not compromise the underlying secrets.

More specifically, the perimeter components 121 depicted in FIG. 5 include a vault 511, a platform 512, a fetcher 513, and a correlation agent 514. The correlation system 130 depicted in FIG. 4 has logical components including an extract-transform-load (ETL) pipeline 521, a mapping service 523, a secrets inventory 524, a correlation database (DB) 525, a non-secret identifiers (NS-IDs) database 526, and a hashes database 527.

On the perimeter side, the fetcher 513 obtains inventory metadata from the vault 511 and the platform 512. More specifically, the inventory metadata may include data related to identities and secrets used by identities, resources, and the like. Moreover, such metadata includes NS-IDs. The inventory metadata is transmitted from the fetcher 513 to the ETL pipeline 521. The vault 511 provides audit logs related to secrets stored in the vault 511 to the fetcher 513. Such audit logs may indicate NS-IDs used by identities and resources with respect to secrets stored in the vault 511 (e.g., NS-IDs of entities which used or otherwise accessed secrets stored in the vault 511).

The ETL pipeline 521 loads NS-IDs among the inventory metadata into the NS-IDs database 526 and the data related to identities and resources into the inventory 524. The mapping service 523 is configured to correlate NS-IDs among the NS-IDs database 526 with secrets stored in the vault 511 with respect to the hashes acting as secret indices for those secrets. The correlations are stored in the correlation database 525 and used to map and score relationships between NS-IDs and secrets stored in the vault 511.

The correlation agent 514 obtains data related to secrets stored in the vault 511. More specifically, in order to provide zero-knowledge secret indexing as described herein, the correlation agent 514 is configured to inventory, tokenize, and hash the secrets stored by the vault 511 in order to create a zero-knowledge index for each secret stored in the vault 511. The zero-knowledge indices may be transmitted to the correlation system 130 for storage in the hashes database 527. As discussed herein, by sending the hashed indices rather than the underlying secrets, the correlation system may identify usage of secrets in order to correlate secrets to non-secret identifiers in a manner which does not reveal the underlying secrets in the event that data stored by the correlation system 130 is improperly accessed.

Further, in order to correlate the secret indices to the NS-IDs, the mapping service 523 is configured to tokenize and hash the NS-IDs. The hashed NS-IDs may be correlated with the secret indices. More specifically, the strength of correlation between a given hashed NS-ID and a respective secret index may be quantified based on a uniqueness of the NS-ID and a number of matches to hashes of NS-IDs of entities which used secrets stored in the vault 511 as indicated in audit logs from the vault 511. In this regard, an endpoint may match many secrets relating to a given database, a username may match other databases having the same username configured, and a secret correlated to both the endpoint and to the username may be identified as being related to the NS-ID of the entity corresponding to both the endpoint and the username.

As illustrated through FIG. 4 (which demonstrates a direct access NS-ID correlation) and FIG. 5 (which demonstrates a zero-knowledge NS-ID correlation), in at least some embodiments, secrets may not be hashed for a direct access NS-ID correlation process while in other embodiments, the secrets are hashed for a zero-knowledge NS-ID correlation process. In this regard, it is noted that a direct access correlation process may involve the mapping service 423 sending a request to the correlation agent 414 to search for the data directly within the vault 411, where the data may be stored in an unencrypted format (e.g., cleartext). It is further noted that a zero-knowledge correlation process may involve the correlation agent 514 hashing all relevant data to be stored in the hashes database 527 to be used for correlation by the mapping service 523.

Figure 6:
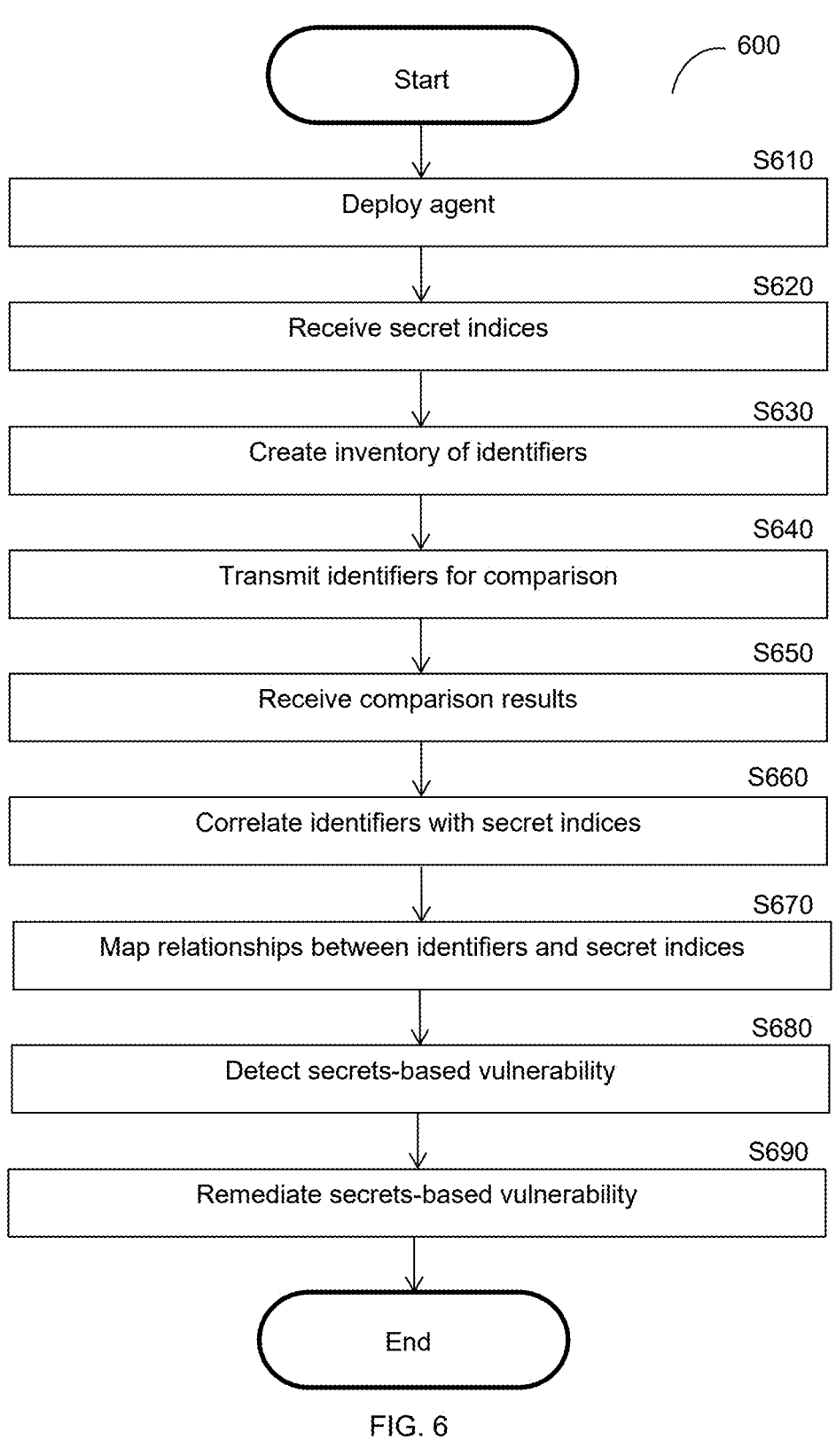
FIG. 6 is a flowchart illustrating a method for remediating secrets-based vulnerabilities using secrets correlation according to an embodiment.

FIG. 6 is a flowchart 600 illustrating a method for remediating secrets-based vulnerabilities using secrets correlation according to an embodiment. In an embodiment, the method is performed by the correlation system 130, FIG. 1. In a further embodiment, the method may be realized using a software-as-a-service (SaaS) implementation.

At S610, an agent (e.g., a correlation agent such as the correlation agent 414 or 514) is deployed. More specifically, the agent may be deployed within a computing environment (e.g., the computing environment 120, FIG. 1) or otherwise such that it can communicate with the computing environment. To this end, deploying the agent may include pushing computer code of the agent to one or more systems (e.g., the servers 125, FIG. 1) of the computing environment such that, when those systems execute the pushed code, the systems become configured to perform functions of the deployed agent.

In an embodiment, the deployed agent is configured to perform zero-knowledge secret indexing. That is, in such an embodiment, the deployed agent may create secret indices corresponding to respective secrets. Secret indices may be or may include hashes of tokenized secrets. An example process for creating zero-knowledge secret indices which may be utilized by the deployed is described further below with respect to FIG. 11.

At S620, secret indices are received. In an embodiment, the secret indices are received from the deployed agent. Each secret index corresponds to a respective secret (e.g., a secret stored in a secrets vault) and can therefore be utilized as a reference to the secret.

Using secret indices allows for performing the process of FIG. 6 in a zero-knowledge manner. That is, an agent deployed in the perimeter of the computing environment in which the secrets are stored or otherwise used may provide the secret indices to the system performing the method of FIG. 6 (e.g., the correlation system 130) in order to enable the system to communicate information related to the secrets to the agent in a manner which uniquely identifies the secrets without exposing the underlying secrets to the system (and, consequently, to any entities which improperly access data of the system). In other words, the agent may be deployed locally within the computing environment and may avoid transmitting the underlying secrets outside of the computing environment.

In an embodiment, each secret index is created such that the secret index does not reveal the content of the secret. To this end, in a further embodiment, each secret index may be or may include one or more hashes (e.g., hashes corresponding to different portions of secret data related to the secret such as a hash of the secret itself, hashes of non-secret identifiers associated with use of the secret, etc.), and in yet a further embodiment, each hash may be created by applying one or more salt values to the secret before applying a hashing algorithm. As discussed herein, the secret may be tokenized into a set of tokens, and at least some of the tokens (e.g., tokens corresponding to respective identifiers associated with use of the secret) may be hashed separately from each other (i.e., generating a first hash value for a first token, a second hash value for a second token, and so on).

At S630, an inventory of identifiers is created. The inventory may be, but is not limited to, a database or other inventory which contains non-secret identifiers of entities acting within the computing environment. In an embodiment, creating the inventory includes analyzing data related to activities performed within the computing environment to identify identifiers used by entities acting within the computing environment. To this end, in an embodiment, S630 further includes applying one or more identifier identification rules which define how to identify non-secret identifiers within portions of such data based on characteristics such as, but not limited to, format, data structure, content, combinations thereof, and the like.

At S640, the inventoried identifiers are transmitted for comparison to the secret indices. In an embodiment, the identifiers are transmitted to an agent which sent the secret indices. In a further embodiment, such an agent is configured to tokenize and hash the identifiers using the same processes and parameters used to tokenize and hash the secret data of each secret index, thereby allowing for effectively comparing instances of the identifiers between the inventory and the secret indices. An example process for correlating secrets to identifiers which may be utilized by such an agent is described further below with respect to FIG. 12.

At S650, results of comparison are received. Such results may indicate, for example but not limited to, which secrets (if any) match each inventoried identifier, a degree of similarity between hashes (e.g., a score indicating a degree to which each pair of compared hashes match each other), both, and the like. The results may identify such secrets with respect to their secret indices.

In other words, the results are indicative of the secrets which are associated with identifiers represented in the inventory. That is, because each secret index is created based on secret data including the secret itself and NS-IDs of entities used to access the secret (e.g., in a vault), a match between a hash of one of the NS-IDs of a given secret index and a hash of one of the inventoried identifiers allows for determining that the inventoried identifier belongs to or was otherwise used by an entity which accessed the secret, which in turn allows for contextually analyzing use of secrets in the computing environment with respect to different identities.

It should be noted that, in at least some embodiments, the system performing the method of FIG. 6 (e.g., the correlation system 130) may compare between the inventoried identifiers and the secret indices. To this end, in an embodiment, the method may include tokenizing the identifiers (e.g., non-secret identifiers) into a set of tokens, and then hashing the tokens into a set of hashes. The set of hashes created this way may be compared to secret indices (e.g., the secret indices received at S610). As discussed herein, the secret indices may be created based on secret data including secrets and associated identifiers (e.g., non-secret identifiers associated with each secret) by tokenizing and hashing that secret data. Accordingly, a hash of an identifier may match a secret index when the hash of the identifier matches one of the hashes of the secret index. In a further embodiment, the identifier is tokenized and hashed using the same tokenization scheme, hashing algorithm, salt value, combinations thereof, and the like, as those used by the agent to create the secret indices such that the same identifier will have the same resulting hash.

At S660, the identifiers are correlated with the secret indices based on data indicating use of the secrets and the identifiers within or otherwise with respect to the computing environment. In an embodiment, the correlation is performed as discussed further below with respect to FIG. 7.

At S670, relationships between the identifiers and the secret indices are mapped. As discussed further below, different aspects of the correlation may each result in a mapping between and among entities such as, but not limited to, consumers, vaults, stored secrets, identities, identifiers (e.g., NS-IDs), and resources. In an embodiment, mapping the relationships may include creating a combined mapping based on the individual mapping created for each aspect of the correlation. To this end, in a further embodiment, the individual mappings may be normalized and combined into a combined mapping. In yet a further embodiment, the individual mappings may be weighted, and connections representing relationships in the combined mapping may be assigned weights. The weights for the connections may be determined based on factors such as, but not limited to, numbers of instances of each connection, which aspect or aspects of correlation were analyzed to identify each connection, both, and the like.

At S680, based on the correlation, a secrets-based vulnerability is detected. The secrets-based vulnerability may be, but is not limited to, misuse (e.g., using a secret by an unauthorized identity or using a secret for an improper purpose), improper storage (e.g., storing a secret in an unauthorized storage location or system), both, and the like. To this end, in an embodiment, S680 includes applying one or more secrets-based vulnerability identification rules. Such rules may identify required criteria for use or storage (i.e., required actions, locations, and the like), forbidden activities or locations for using or storing secrets, both, and the like.

At S690, the secrets-based vulnerability is remediated. Remediating the secrets-based vulnerability may include performing one or more remediation actions with respect to one or more secrets such as, but not limited to, deleting improperly stored secrets; blocking access to a secrets vault for one or more entities which improperly stored, used, or otherwise accessed the secrets; both; and the like. More specifically, in an embodiment, the remediation actions are performed in order to secure one or more secrets. To this end, the remediation actions include changing deployment of a secret (e.g., deleting the secret, moving the secret, etc.), changing access to the secret (e.g., blocking access or requiring additional authentication in order to access the secret), etc. To this end, in a further embodiment, the remediation actions include modifying at least one policy which defines or is otherwise used to control access to each secret being secured (e.g., in order to enforce the changed access to the secret).

Figure 7:
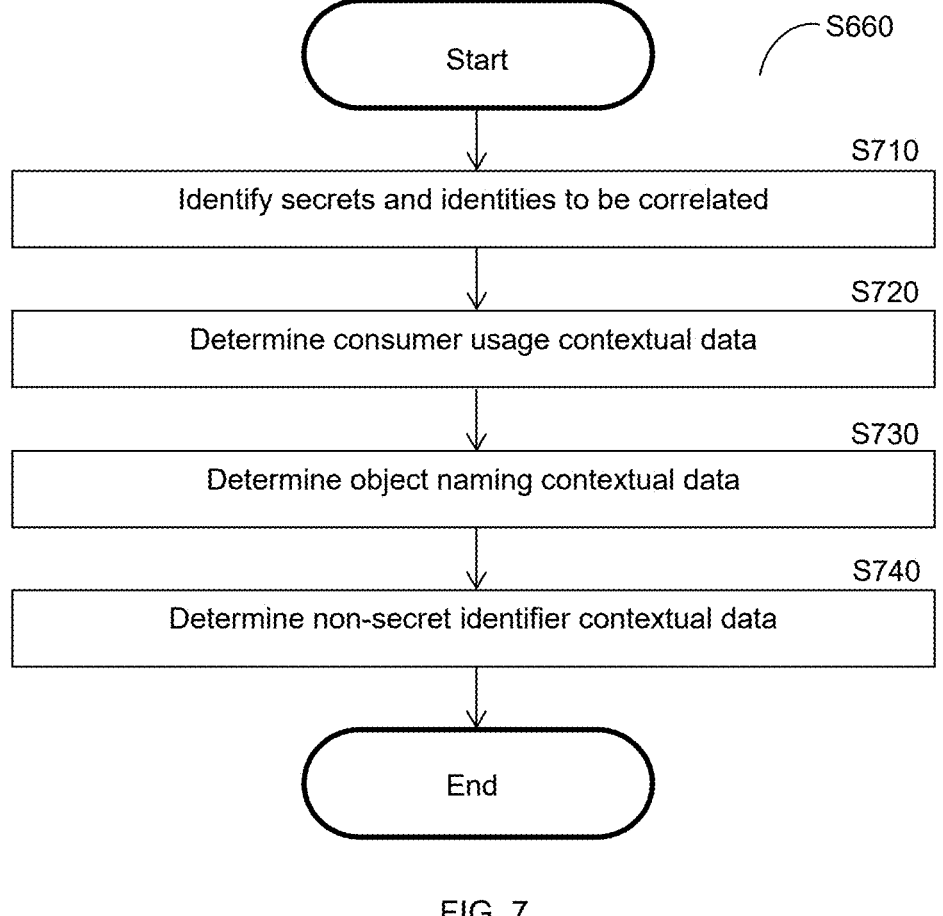
FIG. 7 is a flowchart illustrating a method for correlating secrets to identities according to an embodiment.

FIG. 7 is a flowchart S660 illustrating a method for correlating secrets to identities according to an embodiment.

At S710, secrets and identities to be correlated are identified. The secrets include secrets used to access systems, services, processes, data, data sources, combinations thereof, portions thereof, and the like. The secrets may be or may include, but are not limited to, secrets stored in a vault. Such a vault may further track usage of the secrets stored therein, for example, in the form of audit logs, which may be utilized to correlate secrets to identifiers as discussed therein. More specifically, such audit logs may include indications of the identities which accessed or otherwise used each secret at various points in time, and may store identifiers of those identities which were used while accessing the secrets. The identities may be or may include, but are not limited to, non-secret identifiers (NS-IDs) such as usernames or other user identifiers, system identifiers, application identifiers, network identifiers, combinations thereof, portions thereof, and the like.

The secrets may be or may include privileged credentials used to access potentially sensitive resources such as, but not limited to, functions or other portions of software, applications or other software, data, services, and the like. Non-limiting example secrets include privileged account credentials, passwords, certificates, secure shell (SSH) keys, application programming interface (API) keys, encryption keys, and the like. Secrets are maintained private and access to a secret is normally restricted only to authorized users (e.g., users in the form of machine entities) in order to ensure that unauthorized users cannot authenticate to resources, services, or data requiring the secrets.

The non-secret identifiers include identities or other identifiers of accounts, roles, users, or otherwise identifying the entity authorized to access certain resources. Within a secrets vault, secrets may be stored along with their corresponding non-secret identifiers. Example non-secret identifiers may include, but are not limited to, username, secret identifier, keys, names, authentication endpoints, application endpoints, subscription identifiers, account identifiers, token data (e.g., claims, audience, subject, and issuer), combinations thereof, and the like. A non-secret identifier may be used to publicly identify the entity or account accessing certain resources, for example in access logs, while the corresponding secrets are provided to an entity which manages access to the resources and maintained secret. Misuse or other secrets-based vulnerabilities may lead to secrets becoming public or otherwise unauthorized individuals gaining access to the secrets, which may allow for unauthorized access to the resources guarded by requiring those secrets along with their corresponding non-secret identifiers.

As noted above, usage of identities with secrets may vary even within an organization's computing environment. Accordingly, the disclosed embodiments correlate usage of secrets in combination with those identifiers to other instances of the identifiers operating within the computing environment in order to more accurately identify which identities use secrets within a computing environment, for example in order to secure the computing environment by enforcing policies related to secrets use, storage, and the like.

In an embodiment, the secrets are identified with respect to secret indices of those secrets. That is, in embodiments where zero-knowledge secret indexing is used by the agent deployed at S610, FIG. 6, the secrets may be correlated indirectly by correlating their respective secret indices. Accordingly, in such an embodiment, the secrets to be correlated to identifiers may be identified as the secret indices.

At S720, consumer usage contextual data is determined. The consumer usage contextual data includes data collected based on consumer use of secrets within the computing environment and, in particular, identify consumers who used those secrets to access one or more systems, services, processes, data, data sources, and the like. Accordingly, the consumer usage contextual data may provide additional context related to consumers who may have used identities in combination with secrets in order to improve accuracy of subsequent correlations between secrets and identifiers. In an embodiment, determining the consumer usage contextual data further includes mapping relationships between consumers, vaults, stored secrets, identities, identifiers (e.g., NS-IDs), and resources, based on the consumer usage contextual data.

In an embodiment, the consumer usage contextual data is determined as described further below with respect to FIG. 8.

At S730, object naming contextual data is determined. The object naming contextual data includes data collected based on names of objects, references of objects, or both, which may uniquely correspond to certain identities. That is, certain identities (e.g., identities using certain identifiers) may name objects using similar schemes, formats, content, or combinations thereof, such that comparing object names used by different identities may improve accuracy of subsequent correlations between secrets and identifiers used by respective identities. In an embodiment, determining the object naming contextual data further includes mapping relationships between consumers, vaults, stored secrets, identities, identifiers (e.g., NS-IDs), and resources, based on the object naming contextual data.

In an embodiment, the object naming contextual data is determined as described further below with respect to FIG. 9.

At S740, identifier contextual data is determined. More specifically, the identifier contextual data may be or may include data collected based on non-secret identifiers used by entities within a computing environment. As noted above, the disclosed embodiments allow for correlating between such identifiers and secrets usage in order to determine the underlying identities of entities storing, using, or otherwise accessing secrets within a computing environment. The identifier contextual data may be or may include results of comparing hashes of identifiers to hashes of secret indices performed by an agent, for example the results received as discussed above with respect to S650.

In an embodiment, determining the identifier contextual data further includes mapping relationships between consumers, vaults, stored secrets, identities, identifiers (e.g., NS-IDs), and resources, based on the consumer usage contextual data.

Figure 8:
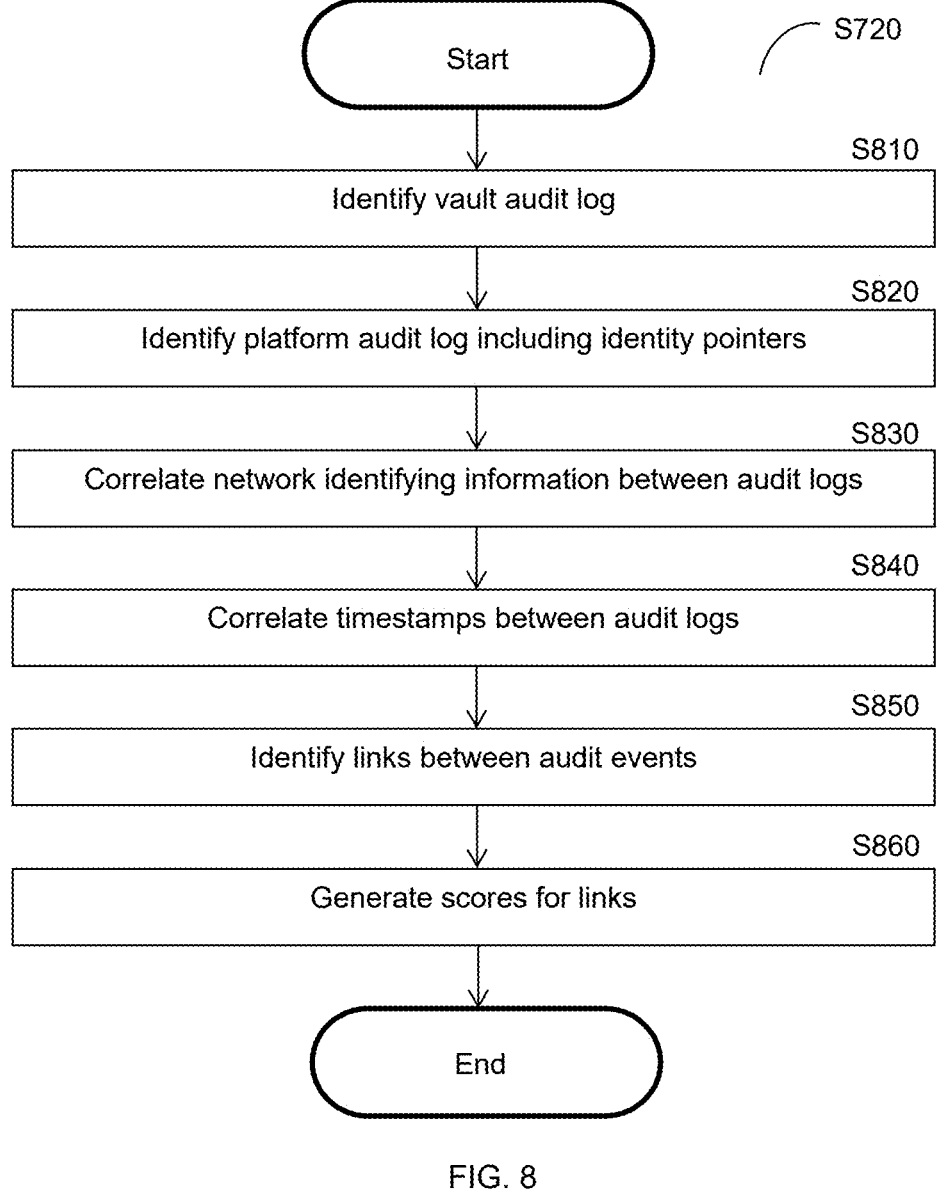
FIG. 8 is a flowchart illustrating a method for consumer usage contextualization according to an embodiment.

FIG. 8 is a flowchart S720 illustrating a method for consumer usage contextualization according to an embodiment.

At S810, vault audit log data is identified. The vault audit log data may include data related to secret access for one or more vaults. More specifically, in an embodiment, the vault audit log data indicates network identifying information of identifiers of entities which accessed the secrets within the vault.

At S820, platform audit log data including identity pointers is identified. More specifically, the platform audit log data includes data related to identity authentication which includes pointers to authenticated identities, for example, pointers to network locations or other locations from which network identifying information about the identities can be determined. Such network identifying information indicates network locations or other information identifying entities in network traffic and may include, but is not limited to, domain information, Internet Protocol (IP) addresses or other network addresses, both, and the like.

At S830, network identifying information is correlated between the vault and platform audit logs. The network identifying information is correlated in order to identify one or more matches between network identifying information, which in turn may be utilized to contextually enrich data of the identifiers. That is, matching network identifying information between two instances of identifiers may be indicative that the different instances are more likely to represent the same identifier or otherwise be related to the same entity.

At S840, timestamps are correlated between audit logs. In an embodiment, the timestamps are correlated using one or more regression analyses. More specifically, timestamps of events represented in the vault and platform audit logs may be correlated to determine which events occurred close in time (e.g., within a threshold period of time from each other). Events involving instances of identifiers which occurred close in time may be indicative that the instances of the identifiers are more likely to represent the same identifier or otherwise be related to the same entity.

At S850, links between audit events are identified. In an embodiment, the links between the audit events are identified based on the correlations between network identifying information, between timestamps, or both, between the vault and platform audit logs.

At S860, scores are generated for the identified links. More specifically, in an embodiment, the generated scores represent if each link is indicative of the same underlying event. The scores may be generated based on the correlations, and may further be generated based on a number of correlations between different instances of each identifier between the vault and platform audit data.

Figure 9:
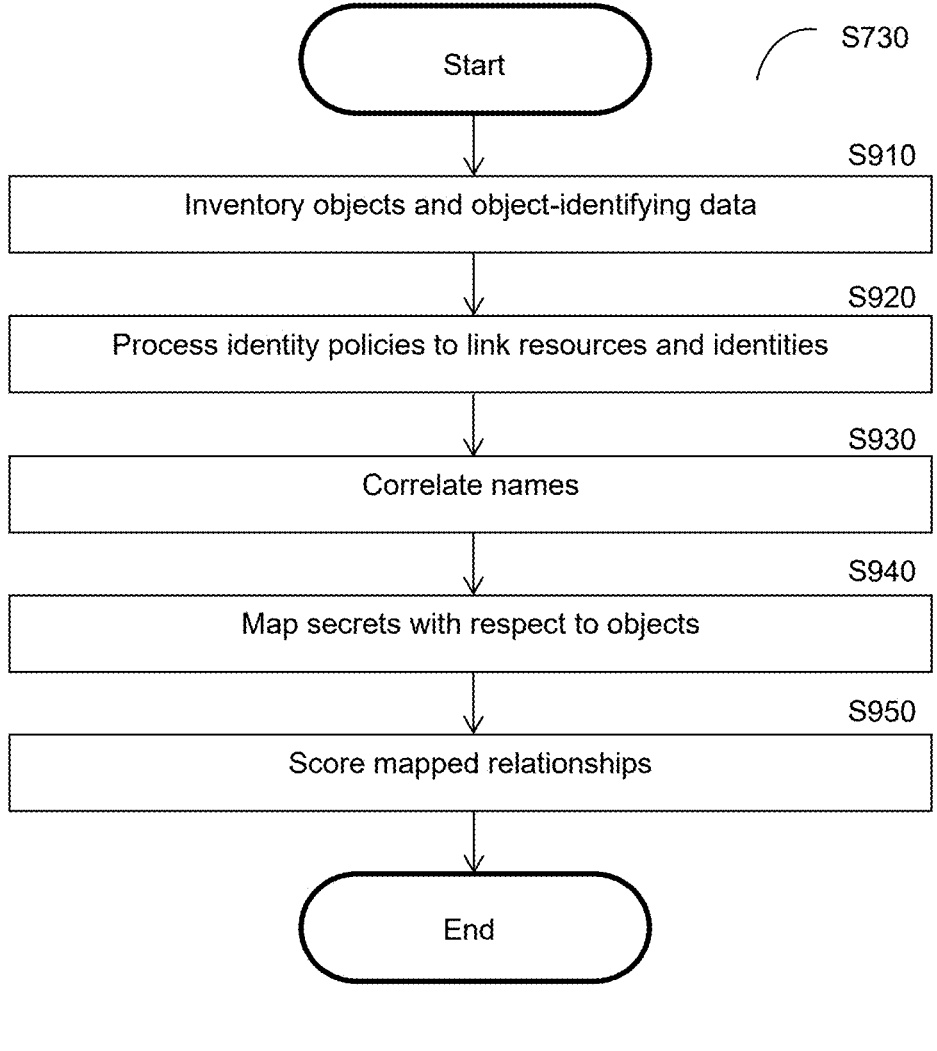
FIG. 9 is a flowchart illustrating a method for object naming contextualization according to an embodiment.

FIG. 9 is a flowchart S730 illustrating a method for object naming contextualization according to an embodiment.

At S910, objects and object-identifying data are inventoried. In an embodiment, the objects are inventoried with respect to object-identifying data including object names, references, or both, of each object. Such names and references may be indicated in data from vaults, identities, resources, or other entities within a given computing environment. The object inventory may therefore represent objects used within the computing environment.

At S920, identity policies are processed in order to link resources and identities. The identity policies may identify resources assigned to or otherwise associated with respective entities such that identities may be linked to resources based on the identity policies.

At S930, names are correlated. In an embodiment, the names are correlated based on string similarity. Object names from different sources may be correlated with each other in order to determine objects which have similar names (e.g., having a string similarity above a predetermined threshold) between such different sources. Moreover, names of other entities within the computing environment (e.g., vaults, stored secrets, identities of entities, resources, etc.) may also be correlated in order to further improve subsequent mapping.

In an embodiment, the correlations between the object names result in matching between object names associated with respective entities (e.g., object names of objects accessed or otherwise used by certain entities). Correlation between object names used or accessed by entities may, in turn, be utilized to aid in correlating between secrets and non-secret identifiers. For example, secrets and non-secret identifiers used by different entities to access the same objects may be indicative that the secrets and non-secret identifiers used by those entities are related to the same sets of authentication credentials. In this regard, it is noted that shared object names between entities may be indicative that there is a relationship between the entities for mapping purposes. Likewise, similar names of entities may be indicative that two names belong to the same underlying entity, thereby further improving the mapping.

At S940, entities within the computing environment are mapped with respect to the objects based on the correlations, the links between resources and identities, both, and the like.

At S950, the mapped relationships between secrets and objects are scored. The scoring may be based on degrees of similarity between names, the links, both, and the like.

Figure 10:
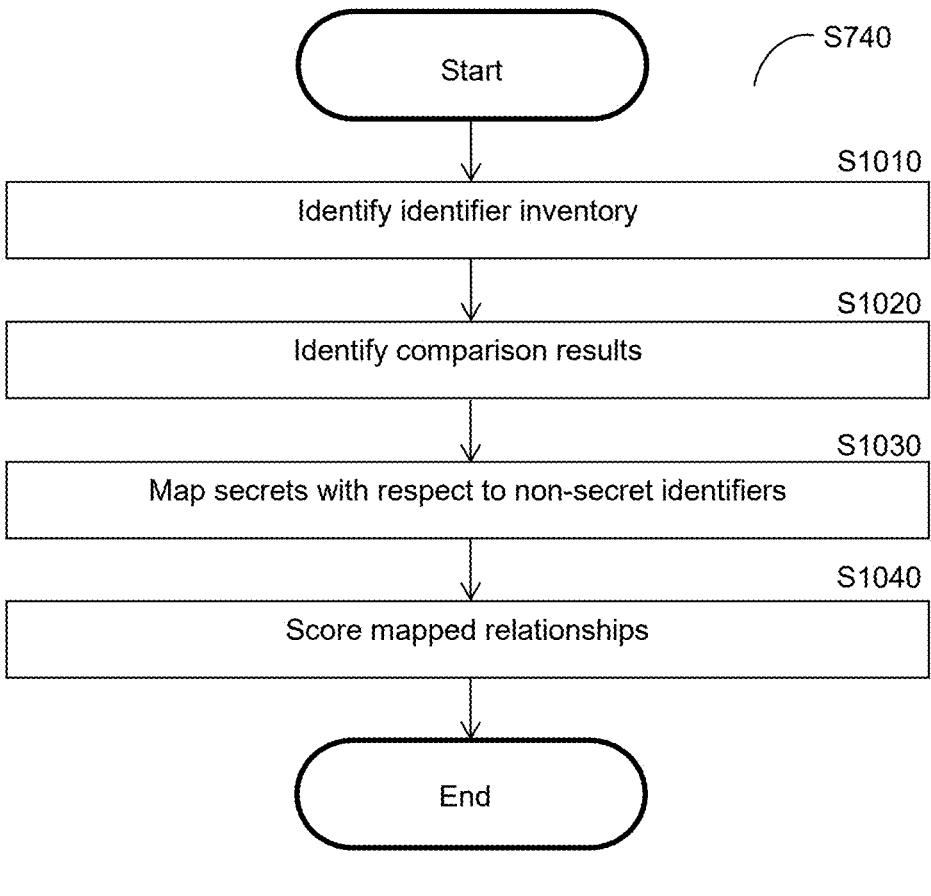
FIG. 10 is a flowchart illustrating a method for non-secret identifier contextualization according to an embodiment.

FIG. 10 is a flowchart S740 illustrating a method for non-secret identifier contextualization according to an embodiment.

At S1010, an identifier inventory including non-secret identifiers (NS-IDs) to be contextualized is identified. In an embodiment, the identifier inventory is created as described further above with respect to S630.

At S1020, comparison results between identifiers in the identifier inventory and secret indices are identified. The comparison results may be or may include the comparison results received from an agent based on the inventoried identifiers transmitted as discussed above with respect to S640 and S650. Alternatively, in an embodiment, S120 includes transmitting the inventoried identifiers to such an agent and receiving comparison results between the inventoried identifiers and the secret indices.

At S1040, secrets are mapped to the NS-IDs based on the comparison results. As noted above, the comparison results may indicate, for example but not limited to, which secrets (if any) match each inventoried identifier. The results may identify such secrets with respect to their secret indices. Thus, the mapping may be determined based on secrets which are determined to match certain identifiers, or otherwise based on a degree of similarity between each identifier and at least a portion of each secret index.

When identifiers and secrets are hashed as discussed above, the comparison may include comparing hashes to identify matches. When the identifiers themselves are utilized, the comparison may include comparing the identifiers to identifiers among the secrets. In an embodiment, a secret or hash thereof matches an identifier or hash thereof when the secret or hash is the same as the identifier or hash. In some embodiments in which the identifiers themselves are utilized, a secret matches an identifier when a similarity between the secret and the identifier is above a predetermined threshold (e.g., as determined by scoring a degree of similarity between the secret and the identifier, and At S1050, the mapped relationships between secrets and NS-IDs are scored. The scoring may be based on degrees of matching between hashes of the secrets and of the NS-IDs, for example as indicated in the comparison results.

Figure 11:
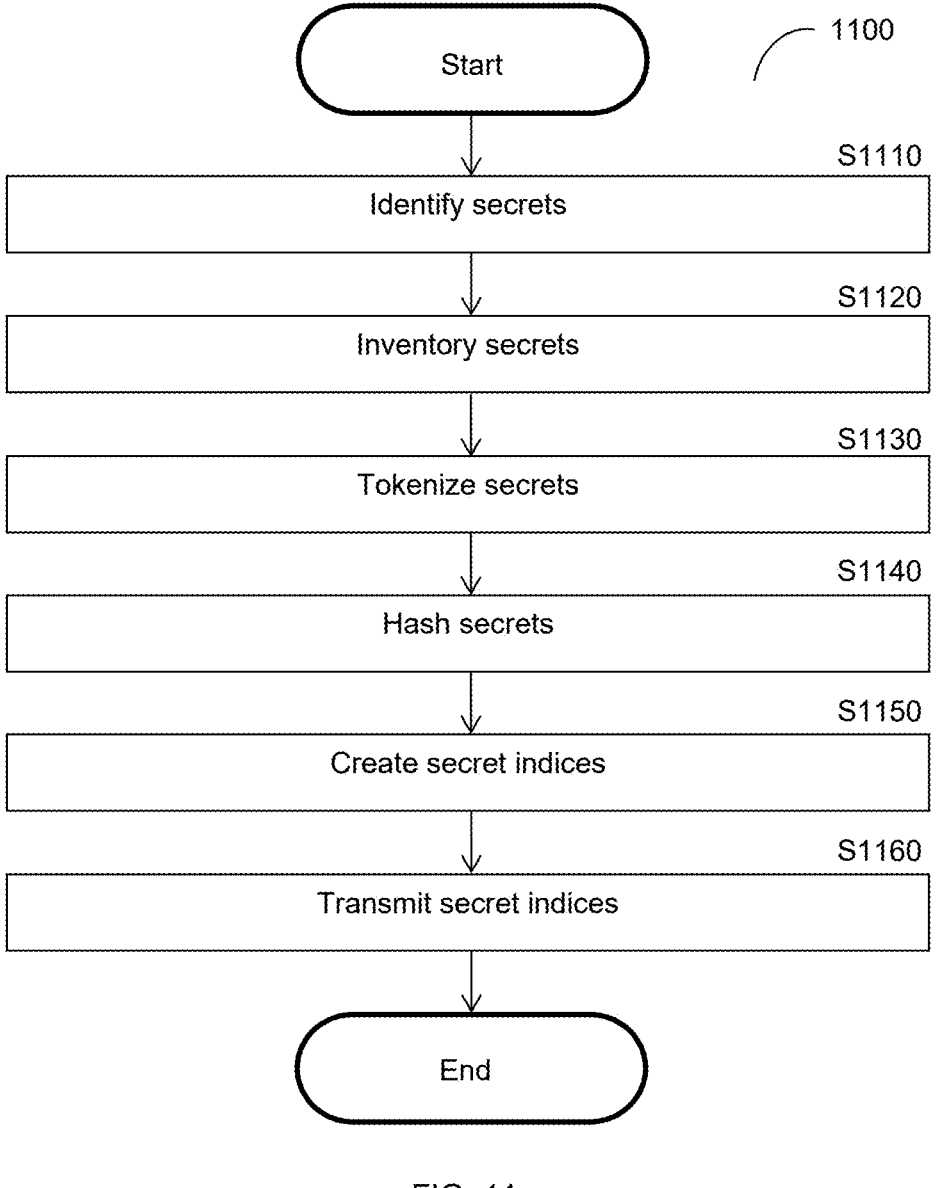
FIG. 11 is a flowchart illustrating a method for zero-knowledge secrets indexing according to an embodiment.

FIG. 11 is a flowchart 1100 illustrating a method for zero-knowledge secrets indexing according to an embodiment. In an embodiment, the method is performed via the hardware layer 1400, FIG. 14. In a further embodiment, the hardware layer 1400 is used to realize an agent (e.g., an agent among the perimeter components 121, FIG. 1) in order to provide secrets indices that do not reveal contents of a secrets vault (e.g., the vault 411 or 511, FIG. 4 or 5) such that, even if the indices are compromised, a malicious actor would not be able to infer the contents of the vault.

At S1110, secrets are identified. The identified secrets may be or may include, but are not limited to, secrets stored in a vault. To this end, S1110 may include searching the vault for secrets.

At S1120, the identified secrets are stored in an inventory of secrets. The inventory of secrets may be a database or other set of data including the secrets to be used for creating zero-knowledge secret indices. The inventory of secrets may include secret data for each of the secrets. More specifically, in an embodiment, the secret data of each secret includes the secret and one or more non-secret identifiers (NS-IDs) associated with use of the secret (e.g., as indicated in data stored in the vault in which the secret is stored).

At S1130, secret data of the secrets are tokenized. In an embodiment, the secret data for each secret may be realized as a connection string including portions corresponding to the secret and to each of the NS-IDs associated with use of the secret. As a non-limiting example, the secret data may be realized as a string formatted as follows:

<scheme>://<username>:   <password>@<endpoint>/
  <dbname>?<flags>

In this non-limiting example, the secret data may be tokenized at least such that the non-secret identifiers <username> and <endpoint> are represented in separate tokens. When these separate tokens are hashed separately, the resulting hashes of the non-secret identifiers can be used separately from the hash of the secret itself (e.g., in order to compare those NS-ID hashes to hashes of other NS-IDs in order to correlate NS-IDs associated with use of each secret to NS-IDs used within the computing environment in other contexts).

In a further embodiment, to allow for matching individual NS-IDs to the secret data, the portions of the secret data corresponding to the respective NS-IDs associated with usage of the secret are hashed separately (i.e., not as part of the same overall string). Tokenizing the secret data enables such separate hashing. More specifically, in an embodiment, the secret data is tokenized such that each NS-ID represented in the secret data for a given secret is tokenized into a respective token.

At S1140, the secret data of the secrets are hashed. As noted above, in an embodiment, the secret data for a given secret is tokenized such that each NS-ID represented in the secret data has a respective token. Each such token may be hashed separately in order to enable subsequent comparison of such hashes to hashes of NS-IDs. The result is a set of hashes corresponding to different portions of the secret data of each secret. To this end, in an embodiment, the resulting set of hashes includes at least a secret hash which is a hash of the secret itself, and one or more NS-ID hashes each of which is a hash of a NS-ID associated with a given use of the secret.

In an embodiment, the secrets are hashed using one or more salt values (e.g., by hashing each token of each secret using the same salt value or using a respective salt value for each token or for tokens of each secret). In a further embodiment, the number of secrets which are hashed using the same salt value may be limited to a predetermined number. In other words, in an embodiment, secret data for each secret of a plurality of secrets may be tokenized into a subset of a plurality of tokens, each subset of tokens may be hashed using a respective salt value, and a number of such subsets hashed using the same hash value is below a predetermined threshold. Such a limit may ensure that the resulting hashes are sufficiently diverse to avoid feasibility of brute-forcing inferring of the secrets based on the secret hashes.

At S1150, a set of secret indices is created. In an embodiment, each secret index corresponds to a respective secret and includes the set of hashes created for that secret (e.g., as discussed above with respect to S1140).

At S1160, the secret indices are transmitted to a correlation system (e.g., the correlation system 130, FIG. 1). As noted above, by transmitting only secret indices externally and not the secrets themselves, an event in which the secret indices are compromised will not result in a malicious actor to gain access to the secrets. In this regard, the correlation system is provided secret indices which may be utilized for correlations without providing the underlying secrets.

Figure 12:
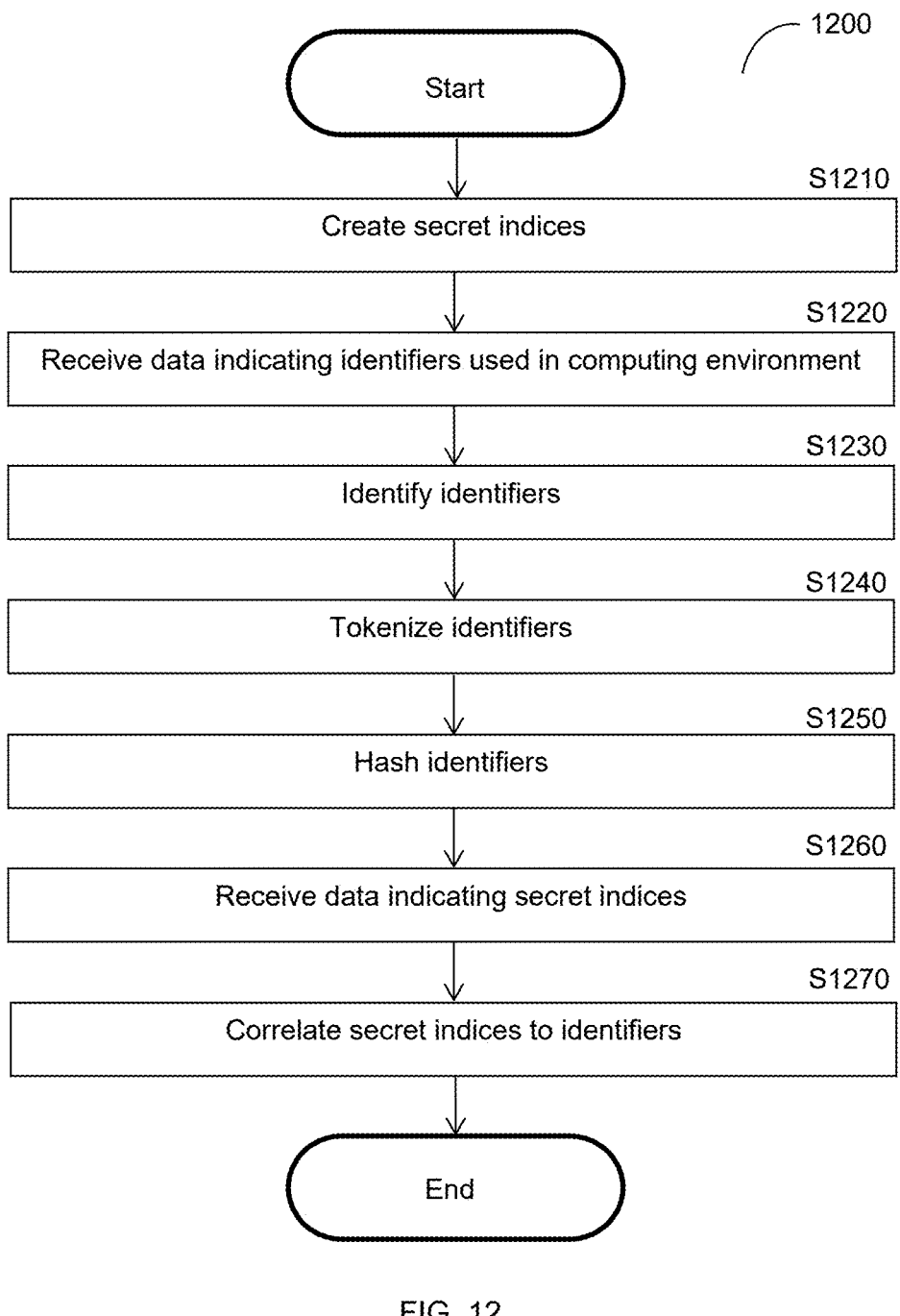
FIG. 12 is a flowchart illustrating a method for zero-knowledge secrets correlation according to an embodiment.

FIG. 12 is a flowchart 1200 illustrating a method for zero-knowledge secrets correlation according to an embodiment. In an embodiment, the method is performed via the hardware layer 1400, FIG. 14. In a further embodiment, the hardware layer 1400 is used to realize an agent (e.g., an agent among the perimeter components 121, FIG. 1) in order to allow for comparing between identifiers and portions of secrets indices that do not reveal contents of a secrets vault (e.g., the vault 411 or 511, FIG. 4 or 5) such that, even if the indices were compromised, a malicious actor would not be able to infer the contents of the vault.

At optional S1210, secret indices are created. In an embodiment, the secret indices are created as described further above with respect to FIG. 11. As noted above, such secret indices may be created by tokenizing the secrets and hashing the tokens. More specifically, different portions of the secrets may be tokenized into different tokens, and each token may be hashed. The set of hashes for each secret may be used as the secret index for the secret. In an embodiment, S1210 further includes transmitting the secret indices to a system (e.g., the correlation system 130, FIG. 1) for use in identifying Also noted above, each secret index may be created using secret data for the corresponding secret which includes non-secret identifiers (NS-IDs) associated with use of the secrets (e.g., NS-IDs of entities which used or otherwise accessed each secret as indicated in audit logs created by a secrets vault or other system managing access to the secrets). To this end, the set of hashes included in each secret index may include one or more hashes of tokens representing NS-IDs of entities which accessed the secrets.

Accordingly, the hashes of these tokens representing NS-IDs may be compared to hashes of other identifiers (e.g., other NS-IDs) used within the computing environment in order to correlate the NS-IDs associated with each secret to other identifiers used within the computing environment, thereby allowing for more accurately identifying which underlying entities (i.e., entities which may use different identifiers when operating within the computing environment) engaged in secrets-related activities within the computing environment, for example in order to better enforce secrets-related policies as discussed above. As discussed herein, the correlations between secrets and non-secret identifiers may be utilized to map relationships between and among entities acting or existing within the computing environment.

At S1220, data indicating identifiers used in a computing environment (e.g., the computing environment in which the secrets represented by the secret indices are stored or used) is received. The data may be received from a system (e.g., the correlation system 130, FIG. 1) which is configured to map relationships between and among entities based on correlations between secrets and non-secret identifiers as discussed herein, for example with respect to FIGS. 6-10.

At S1230, the identifiers are identified in the data received at S1220 are identified. In an embodiment, S1230 includes applying one or more identifier identification rules which define how to identify non-secret identifiers within portions of such data based on characteristics such as, but not limited to, format, data structure, content, combinations thereof, and the like.

At S1240, the identifiers are tokenized. In an embodiment, each identifier is tokenized into a respective token. In a further embodiment, each identifier is tokenized using the same tokenization process as was used during creation of the secret indices. That is, each identifier token is created such that a token for the same identifier created during the secret indexing process would be the same as the token created for that identifier at S1240. Using the same tokenization process ensures that different instances of the same identifier between the secret indexing and the identifier tokenization will be represented in the same manner to ensure that uses of identifiers between the secret data used during the secret indexing and the identifier data received at S1220 can be accurately matched when the identifier is the same.

At S1250, the identifiers are hashed. In an embodiment, the token representing each identifier is hashed into a respective hash. In a further embodiment, each token is hashed using the same hashing algorithm or otherwise using the same hashing process used during the secrets indexing with respect to portions of secret data including identifiers. As discussed above with respect to tokenization, the same process is utilized between secret indexing and identifier hashing in order to ensure that the same identifier will be represented the same in the resulting hash when subjected to both processes. Moreover, when salt values are utilized, the salt values applied may be the same between secret indexing and identifier hashing.

At S1260, data indicating use of secrets represented by the secret indices is received. In an embodiment, the data includes instances of the secret indices. The data may be received, for example, from the system to which the secret indices were transmitted at S1210.

At S1270, one or more secret indices are correlated to the identifiers based on the hashes of the identifiers and hashes among each secret index. The secret indices to be correlated may be or may include secret indices received from a system (e.g., the correlation system 130, FIG. 1) configured to contextually enrich data related to secrets as discussed above with respect to FIGS. 6-10. The secret indices may be utilized by such a system to communicate which secrets were used in different contexts without exposing the underlying secrets to any systems outside of the computing environment.

In an embodiment, correlating the secret indices to the identifiers includes comparing at least a portion of each secret index to the hashes of the identifiers. More specifically, hashes among a set of hashes of each secret index may each be compared to each hash of the identifiers in order to determine whether the hashes match between any secret indices and a given hash of an identifier. In some embodiments, hashes may match when the hash values match above a predetermined threshold. In other embodiments, hashes may only match when their respective hash values are the same.

In an embodiment, the secret indices to be correlated may be created using a zero-knowledge indexing process, for example as discussed above with respect to FIG. 11. More specifically, hashes of different portions of the secret index for each secret (e.g., portions corresponding to identifiers associated with use of the secrets in audit logs) may be compared to the hashes of the identifiers, and pairs of hashes which match above a threshold may be matched. The correlations between secret indices and identifiers may therefore be determined based on pairs of hashes (each pair including one of the hashes of a secret index and a hash of an identifier) which match above the threshold.

Figure 13:
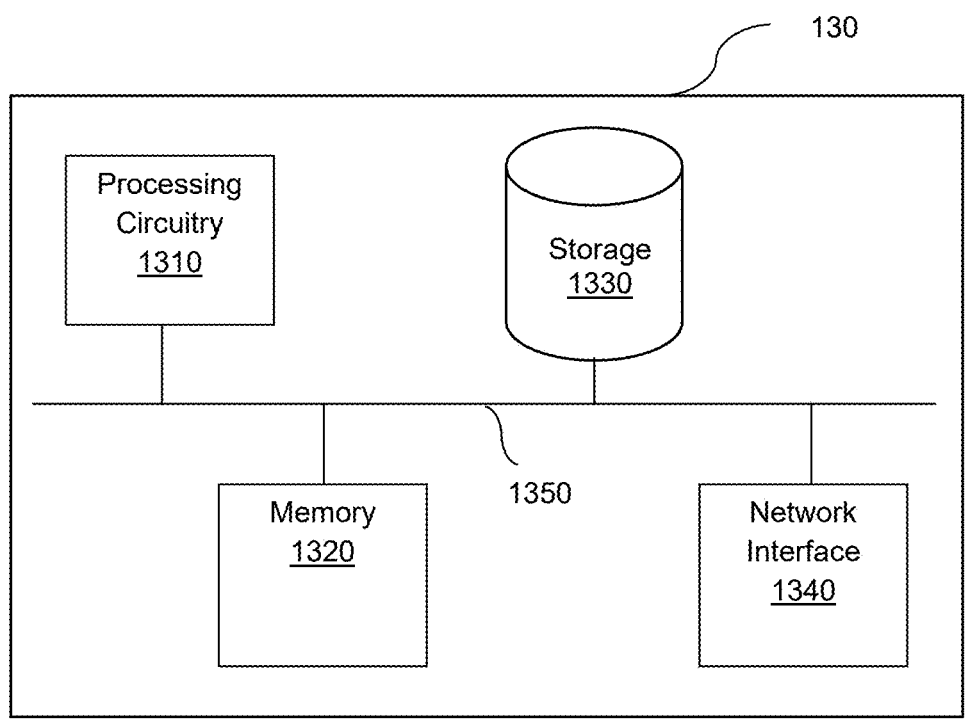
FIG. 13 is a schematic diagram of a correlation system according to an embodiment.

FIG. 13 is an example schematic diagram of a correlation system 130 according to an embodiment. The correlation system 130 includes a processing circuitry 1310 coupled to a memory 1320, a storage 1330, and a network interface 1340. In an embodiment, the components of the correlation system 130 may be communicatively connected via a bus 1350.

The processing circuitry 1310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1320 may be volatile (e.g., random access memory, etc.), non-volatile (e.g., read only memory, flash memory, etc.), or a combination thereof.

In one configuration, software for implementing one or more embodiments disclosed herein may be stored in the storage 1330. In another configuration, the memory 1320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1310, cause the processing circuitry 1310 to perform the various processes described herein.

The storage 1330 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1340 allows the correlation system 130 to communicate with other systems, devices, components, applications, or other hardware or software components, for example as described herein.

It should be understood that the embodiments described herein are not limited to the specific architecture illustrated in FIG. 13, and other architectures may be equally used without departing from the scope of the disclosed embodiments.

Figure 14:
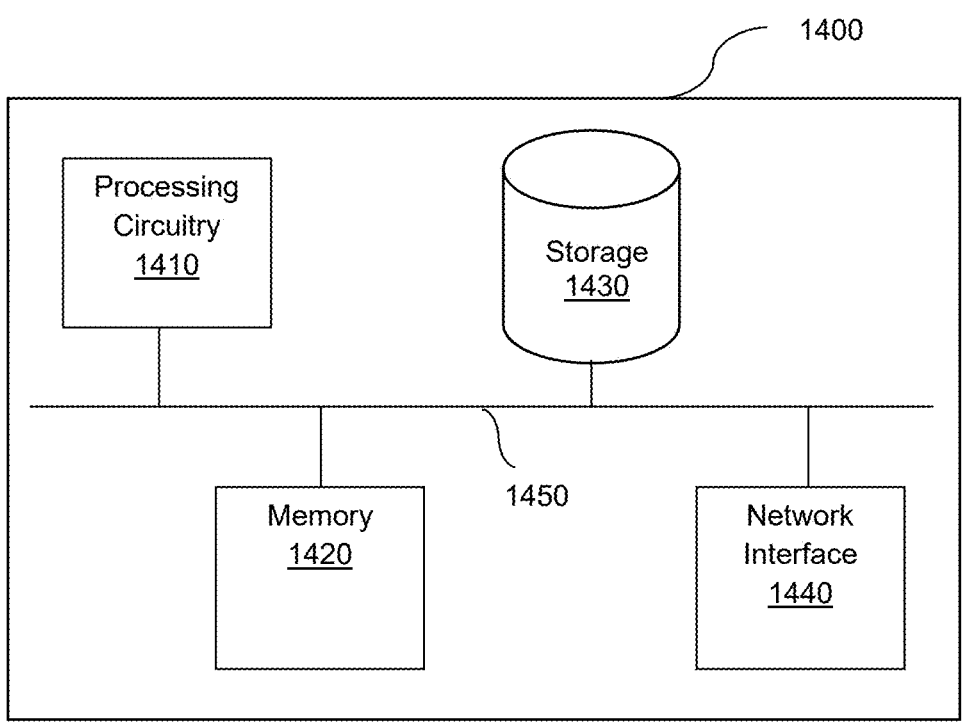
FIG. 14 is a schematic diagram of a hardware layer which may be utilized to realize an agent in accordance with various disclosed embodiments.

FIG. 14 is an example schematic diagram of a hardware layer 1400 which may be utilized to realize at least some disclosed embodiments. The hardware layer 1400 includes a processing circuitry 1410 coupled to a memory 1420, a storage 1430, and a network interface 1440. In an embodiment, the components of the hardware layer 1400 may be communicatively connected via a bus 1450.

The processing circuitry 1410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1420 may be volatile (e.g., random access memory, etc.), non-volatile (e.g., read only memory, flash memory, etc.), or a combination thereof.

In one configuration, software for implementing one or more embodiments disclosed herein may be stored in the storage 1430. In another configuration, the memory 1420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1410, cause the processing circuitry 1410 to perform the various processes described herein.

The storage 1430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1440 allows the hardware layer 1400 to communicate with other systems, devices, components, applications, or other hardware or software components, for example as described herein.

It should be understood that the embodiments described herein are not limited to the specific architecture illustrated in FIG. 14, and other architectures may be equally used without departing from the scope of the disclosed embodiments.

Figure 15:
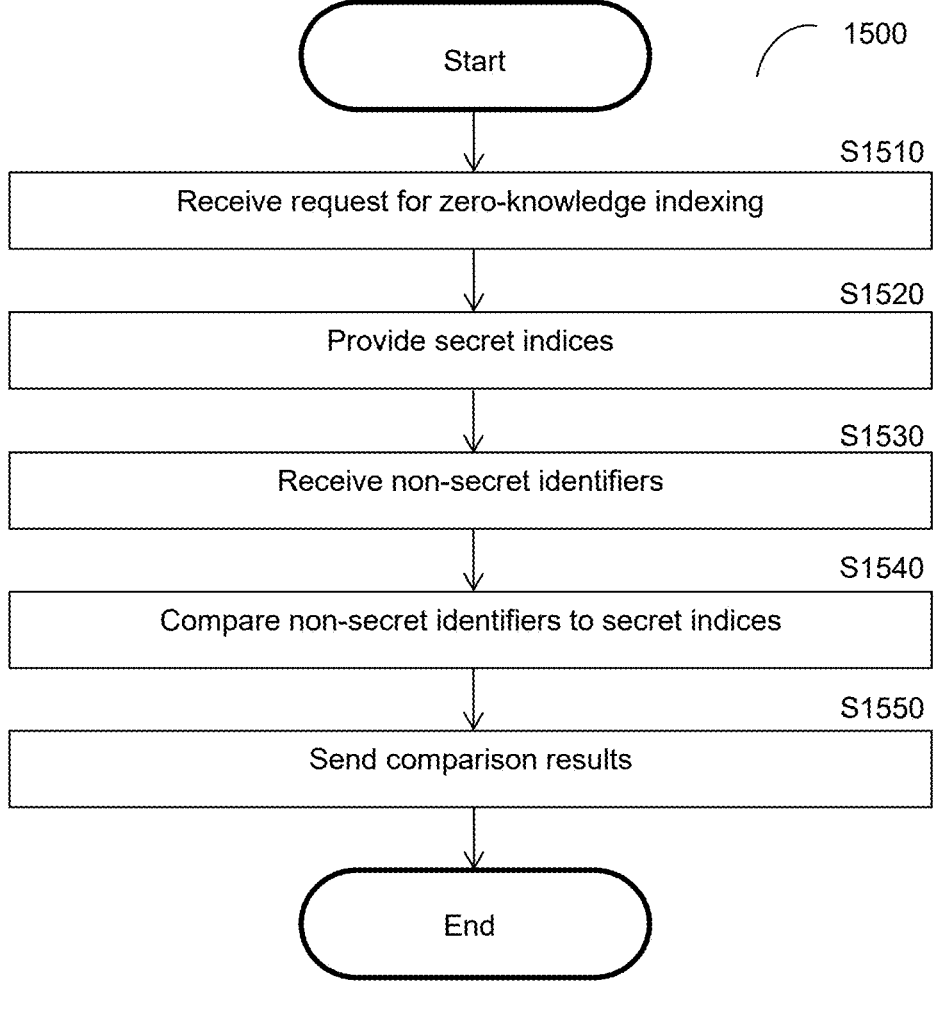
FIG. 15 is a flowchart illustrating a method for securing secrets-related data using zero-knowledge secrets indexing according to an embodiment.

FIG. 15 is a flowchart 1500 illustrating a method for securing secrets-related data using zero-knowledge secrets indexing according to an embodiment. In an embodiment, the method is performed via the hardware layer 1400, FIG. 14. In a further embodiment, the hardware layer 1400 is used to realize an agent (e.g., an agent among the perimeter components 121, FIG. 1) in order to provide secrets indices that do not reveal contents of a secrets vault (e.g., the vault 411 or 511, FIG. 4 or 5) such that, even if the indices are compromised, a malicious actor would not be able to infer the contents of the vault.

At optional S1510, a request for zero-knowledge secrets indexing is received. The request may be received from, for example, a system configured to secure secrets based on secret indices as described herein such as, but not limited to, the correlation system 130. The request may indicate a computing environment for which secrets are to be indexed, one or more locations of secrets to be indexed (e.g., one or more vaults), both, and the like.

At S1520, secret indices are provided, for example, to an external system. In an embodiment, providing the secret indices includes generating secret indices for a set of secrets and transmitting the secret indices for use (e.g., by the external system). For example, the secret indices may be transmitted to the system which sent the request for zero-knowledge secrets indexing or otherwise for a system configured to utilize zero-knowledge secrets to detect and remediate secrets-based vulnerabilities as described herein. In some embodiments, the generated secret indices may also be stored for future reference in one or more locations within the computing environment such as, but not limited to, a vault or other data store where secrets-related data is maintained. The secret indices may be stored in association with their corresponding secrets.

In an embodiment, the secret indices are generated and transmitted as described further above with respect to FIG. 11. More specifically, in an embodiment, the secret indices are generated in a zero-knowledge manner, i.e., such that each secret index does not reveal the corresponding secret which the secret index represents. In other words, each secret index avoids conveying information about the underlying secret. In this regard, each secret index may be utilized to securely represent its corresponding secret when communicating with external entities such as, but not limited to, systems (e.g., the correlation system 130) deployed outside of the computing environment in which the secrets are used.

In an embodiment, one or more one-way hash functions are applied to tokens representing the secrets, associated non-secret identifiers, or both, in order to create a set of hashes corresponding to each secret such that each hash of the set of hashes cannot be used to readily reconstruct the underlying token for which each hash was generated. In a further embodiment, a hash which cannot be used to readily reconstruct the underlying data (e.g., the underlying token) is a hash having at least a predetermined threshold difficulty to decode, where decoding difficulty may be defined with respect to time (e.g., a predetermined amount of time expected to decode the hash), key complexity (as defined with respect to length, types of characters, number of potential characters, combinations thereof, etc.), both, and the like.

To this end, generating the secret indices may include tokenizing secret data for various secrets and generating hashes of the tokens for each secret, where the hashes of the tokens for each secret are utilized to generate the secret index for that secret. For example, for a secret associated with a given non-secret identifier, both the secret and its associated non-secret identifier are tokenized into respective tokens, and hashes of both the secret token and the non-secret identifier token are created. The secret index for that secret may include each of the created hashes.

At S1530, non-secret identifiers are received, for example, from the system which sent the request for zero-knowledge secrets indexing or otherwise for a system configured to utilize zero-knowledge secrets to detect and remediate secrets-based vulnerabilities as described herein. The non-secret identifiers may be, for example, identities or other identifiers indicated in data related to usage of secrets analyzed by the system from which the non-secret identifiers were received.

At S1540, the received non-secret identifiers are compared to the secret indices of the secrets used within the computing environment (e.g., the secrets generated at S1520) in order to generate a set of comparison results. The comparison results may indicate, for example but not limited to, which secret index (if any) corresponds to each non-secret identifier (for example, by indicating which secret index includes a hash matching a hash of the non-secret identifier).

In an embodiment, comparing the non-secret identifiers to the secret indices includes generating hashes for the non-secret identifiers using at least a portion of the same process used to generate the secret instances at S1520. That is, the hashes of the non-secret identifiers are generated such that, when a received non-secret identifier is the same identifier as a non-secret identifier associated with a secret for which a secret index was generated at S1520, the hash of the non-secret identifier will match a hash among that secret index. To this end, in a further embodiment, the same hashing keys, hashing algorithms, tokenization schemes, tokenization algorithms, combinations thereof, and the like, are utilized in order to generate the hashes of the non-secret identifiers received at S1530 as are utilized to generate the secret indices at S1520.

At S1550, the comparison results are sent for use. The comparison results may be or may include, but are not limited to, matching secret indices, indications of degree of matching (if not considering only exact matches to be matching), both, and the like. The comparison results may be utilized to associate the received non-secret identifiers with respective secrets, where the associated secrets are represented in the external system using the secret indices. This, in turn, allows the external system to effectively correlate secrets to non-secret identifiers without having access to the underlying secrets as described herein, for example, with respect to FIGS. 5 and 6.

It should be noted that, in accordance with various disclosed embodiments, the secrets which are indexed are not revealed to any external systems during a process including the steps of the method of flowchart 1500. In this regard, the method of FIG. 15 may be utilized to enable such a system to effectively perform correlation activities in order to correlate secrets with non-secret identifiers (i.e., in order to determine relationships between secrets and non-secret identifiers which are not explicitly known) without exposing the secrets within the computing environment to be exposed to such an external system. Accordingly, the process of FIG. 15 improves security within the computing environment by enabling external analysis without exposing secrets of the computing environment. That is, by performing comparison for an external system without revealing any secrets to the external system, secrets may be correlated by that external system while avoiding exposure of the secrets to potential cyber threats external to the computing environment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for secure secrets management, comprising:

creating an inventory of a plurality of non-secret identifiers used by entities acting with respect to a computing environment;

correlating between secrets of a plurality of secrets and non-secret identifiers of the plurality of non-secret identifiers based on data indicating use of the plurality of secrets and the plurality of non-secret identifiers with respect to the computing environment, wherein correlating between the secrets of the plurality of secrets and the non-secret identifiers of the plurality of non-secret identifiers further comprises:

correlating network identifying information between vault audit log data and platform audit log data based on a plurality of timestamps of the vault audit log data and the platform audit log data, wherein the vault audit log data indicates network identifying information for a plurality of entities which accessed secrets among the plurality of secrets within a vault, wherein the platform audit log data indicates a plurality of identities used for authentication, wherein the secrets and the non-secret identifiers are correlated based on the correlated network identifying information;

receiving a plurality of secret indices from an agent deployed with respect to the computing environment wherein the plurality of secret indices is created based on the plurality of secrets;

tokenizing the plurality of non-secret identifiers into a plurality of tokens;

hashing the plurality of tokens in order to generate a plurality of hashes;

comparing between the plurality of hashes and the plurality of secret indices in order to determine comparison results, wherein the secrets of the plurality of secrets and the non-secret identifiers of the plurality of non-secret identifiers are correlated based on the comparison results;

detecting a secrets-based vulnerability with respect to at least one first secret of the plurality of secrets based on the correlation between the secrets of the plurality of secrets and the non-secret identifiers of the plurality of non-secret identifiers; and performing a remediation action to secure the at least one first secret based on the detected secrets-based vulnerability.

2. The method of claim 1, wherein correlating between the secrets of the plurality of secrets and the non-secret identifiers of the plurality of non-secret identifiers further comprises:

correlating object names of a plurality of objects accessed by a plurality of entities within the computing environment; and mapping between entities of the plurality of entities within the computing environment based on the correlated object names, wherein the secrets and the non-secret identifiers are correlated based further on the mapping between the entities of the plurality of entities within the computing environment.

3. The method of claim 1, wherein the plurality of non-secret identifiers is a first plurality of non-secret identifiers, wherein correlating between the secrets of the plurality of secrets and the non-secret identifiers of the first plurality of non-secret identifiers further comprises:

transmitting the first plurality of non-secret identifiers to an agent deployed with respect to the computing environment, wherein the agent is configured to compare between the first plurality of non-secret identifiers and a second plurality of non-secret identifiers corresponding to respective secrets of the plurality of secrets in order to determine comparison results; and receiving the comparison results from the agent, wherein the secrets of the plurality of secrets and the non-secret identifiers of the first plurality of non-secret identifiers are correlated based on the comparison results.

4. The method of claim 3, further comprising:

deploying the agent with respect to the computing environment, wherein the agent is configured to index the plurality of secrets into a plurality of secret indices.

5. The method of claim 4, wherein each secret index of the plurality of secret indices includes at least one hash.

6. The method of claim 5, wherein the at least one hash of each secret index includes at least one first hash and at least one second hash, wherein each first hash of each secret index corresponds to a secret among the plurality of secrets, wherein each second hash of each secret index corresponds to a non-secret identifier among the plurality of non-secret identifiers.

7. The method of claim 1, wherein the remediation action includes changing deployment of the at least one first secret.

8. The method of claim 1, wherein the remediation action includes modifying a policy used to control access to each of the at least one first secret.

9. A non-transitory computer readable medium having stored thereon instructions for causing a processing circuitry to execute a process, the process comprising:

creating an inventory of a plurality of non-secret identifiers used by entities acting with respect to a computing environment;

correlating between secrets of a plurality of secrets and non-secret identifiers of the plurality of non-secret identifiers based on data indicating use of the plurality of secrets and the plurality of non-secret identifiers with respect to the computing environment, wherein correlating between the secrets of the plurality of secrets and the non-secret identifiers of the plurality of non-secret identifiers further comprises:

correlating network identifying information between vault audit log data and platform audit log data based on a plurality of timestamps of the vault audit log data and the platform audit log data, wherein the vault audit log data indicates network identifying information for a plurality of entities which accessed secrets among the plurality of secrets within a vault, wherein the platform audit log data indicates a plurality of identities used for authentication, wherein the secrets and the non-secret identifiers are correlated based on the correlated network identifying information;

receiving a plurality of secret indices from an agent deployed with respect to the computing environment wherein the plurality of secret indices is created based on the plurality of secrets;

tokenizing the plurality of non-secret identifiers into a plurality of tokens;

hashing the plurality of tokens in order to generate a plurality of hashes;

comparing between the plurality of hashes and the plurality of secret indices in order to determine comparison results, wherein the secrets of the plurality of secrets and the non-secret identifiers of the plurality of non-secret identifiers are correlated based on the comparison results;

detecting a secrets-based vulnerability with respect to at least one first secret of the plurality of secrets based on the correlation between the secrets of the plurality of secrets and the non-secret identifiers of the plurality of non-secret identifiers; and performing a remediation action to secure the at least one first secret based on the detected secrets-based vulnerability.

10. A system for secure secrets management, comprising:

a processing circuitry; and a memory, the memory containing instructions that, when executed by the processing circuitry, configure the system to:

creating an inventory of a plurality of non-secret identifiers used by entities acting with respect to a computing environment;

correlate between secrets of a plurality of secrets and non-secret identifiers of the plurality of non-secret identifiers based on data indicating use of the plurality of secrets and the plurality of non-secret identifiers with respect to the computing environment, wherein the system is further configured to:

correlate network identifying information between vault audit log data and platform audit log data based on a plurality of timestamps of the vault audit log data and the platform audit log data, wherein the vault audit log data indicates network identifying information for a plurality of entities which accessed secrets among the plurality of secrets within a vault, wherein the platform audit log data indicates a plurality of identities used for authentication, wherein the secrets and the non-secret identifiers are correlated based on the correlated network identifying information;

receive a plurality of secret indices from an agent deployed with respect to the computing environment wherein the plurality of secret indices is created based on the plurality of secrets;

tokenize the plurality of non-secret identifiers into a plurality of tokens;

hash the plurality of tokens in order to generate a plurality of hashes;

compare between the plurality of hashes and the plurality of secret indices in order to determine comparison results, wherein the secrets of the plurality of secrets and the non-secret identifiers of the plurality of non-secret identifiers are correlated based on the comparison results;

detect a secrets-based vulnerability with respect to at least one first secret of the plurality of secrets based on the correlation between the secrets of the plurality of secrets and the non-secret identifiers of the plurality of non-secret identifiers; and perform a remediation action to secure the at least one first secret based on the detected secrets-based vulnerability.

11. The system of claim 10, wherein the system is further configured to:

correlate object names of a plurality of objects accessed by a plurality of entities within the computing environment; and map between entities of the plurality of entities within the computing environment based on the correlated object names, wherein the secrets and the non-secret identifiers are correlated based further on the mapping between the entities of the plurality of entities within the computing environment.

12. The system of claim 10, wherein the plurality of non-secret identifiers is a first plurality of non-secret identifiers, wherein the system is further configured to:

transmit the first plurality of non-secret identifiers to an agent deployed with respect to the computing environment, wherein the agent is configured to compare between the first plurality of non-secret identifiers and a second plurality of non-secret identifiers corresponding to respective secrets of the plurality of secrets in order to determine comparison results; and receive the comparison results from the agent, wherein the secrets of the plurality of secrets and the non-secret identifiers of the first plurality of non-secret identifiers are correlated based on the comparison results.

13. The system of claim 12, wherein the system is further configured to:

deploy the agent with respect to the computing environment, wherein the agent is configured to index the plurality of secrets into the plurality of secret indices.

14. The system of claim 12, wherein each secret index of the plurality of secret indices includes at least one hash.

15. The system of claim 14, wherein the at least one hash of each secret index includes at least one first hash and at least one second hash, wherein each first hash of each secret index corresponds to a secret among the plurality of secrets, wherein each second hash of each secret index corresponds to a non-secret identifier among the plurality of non-secret identifiers.

16. The system of claim 10, wherein the remediation action includes changing deployment of the at least one first secret.

17. The system of claim 10, wherein the remediation action includes modifying a policy used to control access to each of the at least one first secret.

* * * * *